(12) United States Patent
Yanatsubo

(10) Patent No.: US 7,039,868 B2
(45) Date of Patent: May 2, 2006

(54) INFORMATION PROCESSING APPARATUS, INFORMATION PROCESSING METHOD, STORAGE MEDIUM, AND PROGRAM

(75) Inventor: Yoshie Yanatsubo, Kanagawa (JP)

(73) Assignee: Sony Corporation, (JP)

( * ) Notice: Subject to any disclaimer, the term of this patent is extended or adjusted under 35 U.S.C. 154(b) by 635 days.

(21) Appl. No.: 10/192,374

(22) Filed: Jul. 9, 2002

(65) Prior Publication Data

US 2003/0020761 A1    Jan. 30, 2003

(30) Foreign Application Priority Data

Jul. 11, 2001    (JP)    ............................ P2001-210117

(51) Int. Cl.
*G09G 5/00*    (2006.01)
(52) U.S. Cl. ...................... 715/712; 715/532; 715/776; 715/780; 715/764
(58) Field of Classification Search ........ 715/786–787, 715/784, 799–788, 505–508, 516–526, 530–539, 715/500, 762, 780, 776, 781, 764, 712
See application file for complete search history.

(56) References Cited

U.S. PATENT DOCUMENTS

| | | | | |
|---|---|---|---|---|
| 5,469,540 A | * | 11/1995 | Powers et al. | ........... 715/500.1 |
| 5,557,794 A | * | 9/1996 | Matsunaga et al. | ............ 707/3 |
| 5,913,215 A | * | 6/1999 | Rubinstein et al. | ........... 707/10 |
| 6,091,415 A | * | 7/2000 | Chang et al. | ................ 715/809 |
| 6,370,282 B1 | * | 4/2002 | Pavley et al. | ................ 382/311 |
| 6,392,640 B1 | * | 5/2002 | Will | ........................... 345/184 |
| 6,584,460 B1 | * | 6/2003 | Iwayama et al. | .............. 707/3 |
| 6,741,235 B1 | * | 5/2004 | Goren | ......................... 345/173 |

\* cited by examiner

*Primary Examiner*—Tadesse Hailu
(74) *Attorney, Agent, or Firm*—Lerner, David, Littenberg, Krumholz & Mentlik, LLP

(57) ABSTRACT

A graphical user interface allows a user to easily input a character via a small-sized display screen without having to use a keyboard, wherein first and second page bars are displayed in a page bar display area, and a first and second display windows are displayed on the first and second page bars, respectively. The positions of the first and second display windows on the first and second page bars are changed in response to an inputting operation performed by a user. Characters displayed in the respective first and second display windows are determined in accordance with the positions of the first and second display windows. Forward retrieval is performed in accordance with the characters displayed, and retrieved data is displayed in an entry display area and a main body display area. By changing the position of a cursor, which is displayed on a page bar when the two characters displayed in the respective display windows are fixed, the user can select a desired word from those which are displayed in the entry display area. The word selected from the words starting with the two fixed characters and a main body corresponding to the selected word are displayed.

10 Claims, 21 Drawing Sheets

INFORMATION PROCESSING APPARATUS, INFORMATION PROCESSING METHOD, STORAGE MEDIUM, AND PROGRAM

BACKGROUND OF THE INVENTION

1. Field of the Invention

The present invention relates to an information processing apparatus, an information processing method, a storage medium, and a program, and more particularly, to an information processing apparatus, an information processing method, a storage medium, and a program, which allow a user to easily retrieve information from an electronic dictionary via a small-sized user-friendly display screen.

2. Description of the Related Art

Conventionally, paper is mainly used as a medium in publishing of books, newspaper, magazines, or the like. However, as great advances have been achieved in the computer technology and computer are becoming increasingly popular in a wide variety of fields, and networks have been well established, electronic publishing using no paper medium has also become popular.

Electronic publishing is suitable in particular for contents including a large amount of information, such as dictionaries, handbooks, encyclopedias, and illustrated reference books. For example, only a single CD-ROM (Compact Disk-Read Only Memory) can store as large an amount of information as an entire content of an encyclopedia, which needs 30 books if it is described using a paper medium. Thus, many dictionaries, handbooks, encyclopedias are now published in the form of digital data including not only text data but also still image data, audio data, and motion image data, rather than in the form of paper books. Such digital data can be stored in storage media, personal computers, or playback apparatuses. A user can obtain desired information by performing retrieval in terms of an entry using a personal computer or a playback apparatus in which dictionary data is stored or on which a storage medium including dictionary data stored therein is mounted.

As a result of rapid popularization of the Internet, on-line dictionaries are also widely used. Such an on-line dictionary data is stored in a server and can be accessed by users via the Internet. Furthermore, a great advance is achieved in the technology of storage media, and small-sized high-capacity media have become available. As a result, it has become possible to realize small-sized electronic dictionaries.

However, for users who are unaccustomed to using a keyboard, it is very difficult to input a word to be retrieved, and such a user tends to use a conventional paper dictionary. In a case in which an electronic dictionary is used on a small-sized portable device (such as a small-sized electronic book player or a PDA (Personal Digital Data Assistants) which is now widely used because of its easy portability, a keyboard provided thereon is difficult to use because of its small size. In some cases, no keyboard is provided, and users must perform a complicated operation to input characters. This makes it difficult for a user to input characters in dictionary retrieval.

In a case in which a word to be retrieved is input without using a keyboard, it is desirable that a user can visually recognize the relative position of a character being retrieved. This is very convenient in particular for those users who are accustomed to using conventional paper dictionaries. That is, if a GUI (Graphical User Interface) indicates the relative position of a character being retrieved, the GUI can provide a dictionary retrieval function which can be easily used by users who are accustomed to using paper media.

However, if a plurality of characters (all or part of 26 alphabetic characters) are displayed on a single screen so that a user can visually recognize the relative positions of characters being retrieved and so that the user can select a desired character from the displayed characters, or so that a character being selected is displayed, the GUI for inputting characters without using a keyboard becomes complicated. In many cases, an electronic dictionary or a PDA has a small-sized display screen. If a GUI including a large number of characters in a small size is displayed on such a small-sized display screen, the characters are difficult to read, and thus inputting operations become difficult.

In a case in which dictionary retrieval is performed using an apparatus having a large-sized display screen, such as a personal computer, an electronic dictionary is generally used together with another software program such as a web browser or a word processor. In this case, many window screens are opened on a limited physical display screen, and thus there is also a need for a small-sized user-friendly window screen for use in retrieval of information from an electronic dictionary.

In view of the above, it is an object of the present invention to provide a technique which allows a user to easily retrieve information from an electronic dictionary via a display screen which can be easily handled even if it has a small size.

SUMMARY OF THE INVENTION

The present invention provides a first information processing apparatus comprising input operation reception means for receiving a user inputting operation, first display control means for controlling displaying a display window in which one character is displayed, second display control means for controlling, in accordance with the user inputting operation received by the input operation reception means, displaying the character in the display window displayed under the control by the first display control means, and character acquisition means for acquiring the character displayed under the control of the second display control means.

The first information processing apparatus may further comprise third display control means for controlling displaying a graphics image indicating an area within which the display window, which is displayed under the control of the first display control means, is allowed to move, wherein the first display control means may control displaying the display window such that the position of the display window is moved, in accordance with the user inputting operation received by the input operation reception means, within the graphics image displayed under the control of the third display control means, and the second display control means may determine, in accordance with the position of the display window, which character is to be displayed in the display window, and may display the determined character in the display window.

The first information processing apparatus may further comprise storage means for storing electronic book data, retrieval means for retrieving data from the electronic book data stored in the storage means, in accordance with the character acquired by the character acquisition means, and third display control means for controlling displaying the data retrieved by the retrieval means.

The first display control means may control displaying a plurality of display windows, the character acquisition means may acquire a plurality of characters which are displayed, under the control of the second display control means, in the plurality of display windows, and the retrieval means may retrieve, from the electronic book data stored in the storage means, first data corresponding to the plurality of characters acquired by the character acquisition means.

The first information processing apparatus may further comprise forth display control means for controlling displaying a graphics image indicating a particular area, and position information acquisition means for acquiring information indicating a position, which is selected, by a user, within the area displayed under the control of the forth display control means, in accordance with a user inputting operation received by the input operation reception means, wherein the retrieval means may further retrieve, in accordance with the information indicating the position acquired by the position information acquisition means, second data included in the first data retrieved in accordance with the plurality of characters acquired by the character acquisition means.

The present invention also provide a first information processing method comprising an input operation reception step of receiving a user inputting operation, a first display control step of controlling displaying a display window in which one character is displayed, a second display control step of controlling, in accordance with the user inputting operation received in the input operation reception step, displaying the character in the display window displayed under the control performed in the first display control step, and a character acquisition step of acquiring the character displayed under the control performed in the second display control step.

The present invention also provides a first storage medium including a program, stored therein, comprising an input operation reception step of receiving a user inputting operation, a first display control step of controlling displaying a display window in which one character is displayed, a second display control step of controlling, in accordance with the user inputting operation received in the input operation reception step, displaying the character in the display window displayed under the control performed in the first display control step, and a character acquisition step of acquiring the character displayed under the control performed in the second display control step.

The present invention also provides a first program comprising an input operation reception step of receiving a user inputting operation, a first display control step of controlling displaying a display window in which one character is displayed, a second display control step of controlling, in accordance with the user inputting operation received in the input operation reception step, displaying the character in the display window displayed under the control performed in the first display control step, and a character acquisition step of acquiring the character displayed under the control performed in the second display control step.

The present invention also provides a second information processing apparatus comprising storage means for storing electronic book data, input operation reception means for receiving a user inputting operation, first display control means for controlling displaying, at a specific position, a display window in which one character is displayed, second display control means for controlling, in accordance with the user inputting operation performed on the input operation reception means, displaying the character in the display window displayed under the control by the first display control means, character acquisition means for acquiring the character displayed under the control of the second display control means, third display control means for controlling displaying a graphics image indicating a particular area, position information acquisition means for acquiring information indicating a position, which is selected, by a user, within the area displayed under the control of the third display control means, in accordance with a user inputting operation received by the input operation reception means, retrieval means for retrieving particular data from the electronic book data stored in the storage means, in accordance with the character acquired by the character acquisition means and in accordance with the information indicating the position acquired by the position information acquisition means, and forth display control means for controlling displaying the particular data retrieved by the retrieval means.

The first display control means may control displaying a plurality of display windows, and the character acquisition means may acquire a plurality of characters which are displayed, under the control of the second display control means, in the plurality of display windows.

The present invention also provides a second information processing method comprising a storage step of storing electronic book data, an input operation reception step of receiving a user inputting operation, a first display control step of controlling displaying, at a specific position, a display window in which one character is displayed, a second display control step of controlling, in accordance with the user inputting operation received in the input operation reception step, displaying the character in the display window displayed under the control performed in the first display control step, a character acquisition step of acquiring the character displayed under the control performed in the second display control step, a third display control step for controlling displaying a graphics image indicating a predetermined area, a position information acquisition step of acquiring information indicating a position, which is selected, by a user, within the area displayed under the control performed in the third display control step, in accordance with a user inputting operation received in the input operation reception step, a retrieval step for retrieving particular data from the electronic book data stored in the storage step, in accordance with the character acquired in the character acquisition step and in accordance with the information indicating the position acquired in the position information acquisition step, and a fourth display control step for controlling displaying the particular data retrieved in the retrieval step.

The present invention also provides a second storage medium including a program, stored therein, comprising a storage step of storing electronic book data, an input operation reception step of receiving a user inputting operation, a first display control step of controlling displaying, at a specific position, a display window in which one character is displayed, a second display control step of controlling, in accordance with the user inputting operation received in the input operation reception step, displaying the character in the display window displayed under the control performed in the first display control step, a character acquisition step of acquiring the character displayed under the control performed in the second display control step, a third display control step for controlling displaying a graphics image indicating a predetermined area, a position information acquisition step of acquiring information indicating a position, which is selected, by a user, within the area displayed under the control performed in the third display control step, in accordance with a user inputting operation received in the input operation reception step, a retrieval step for retrieving particular data from the electronic book data stored in the storage step, in accordance with the character acquired in the character acquisition step and in accordance with the information indicating the position acquired in the position information acquisition step, and a fourth display control step for controlling displaying the particular data retrieved in the retrieval step.

The present invention also provides a second program comprising a storage step of storing electronic book data, an input operation reception step of receiving a user inputting operation, a first display control step of controlling displaying, at a specific position, a display window in which one character is displayed, a second display control step of controlling, in accordance with the user inputting operation received in the input operation reception step, displaying the character in the display window displayed under the control performed in the first display control step, a character acquisition step of acquiring the character displayed under the control performed in the second display control step, a third display control step for controlling displaying a graphics image indicating a predetermined area, a position information acquisition step of acquiring information indicating a position, which is selected, by a user, within the area displayed under the control performed in the third display control step, in accordance with a user inputting operation received in the input operation reception step, a retrieval step for retrieving data from the electronic book data stored in the storage step, in accordance with the character acquired in the character acquisition step and in accordance with the information indicating the position acquired in the position information acquisition step, and a fourth display control step for controlling displaying the particular data retrieved in the retrieval step.

In the first information processing apparatus, information processing method, and program according to the present invention, an inputting operation is performed by a user, displaying a display window for displaying one character therein is controlled, displaying the character in the display window is controlled in accordance with the inputting operation performed by the user, and the character being displayed is acquired.

In the second information processing apparatus, information processing method, and program according to the present invention, electronic book data is stored, an inputting operation is performed by a user, displaying a display window for displaying one character therein is controlled so as to be displayed at a specific position; displaying the character in the display window is controlled in accordance with an inputting operation performed by the user, the character being displayed is acquired, displaying a graphics image indicating a specific area is controlled, information indicating a position selected by a user within the area indicated by the graphics image is acquired in accordance with an inputting operation performed by the user, data is retrieved from the electronic book data in accordance with the acquired character and the acquired information indicating the position, and the retrieved data is displayed.

DESCRIPTION OF THE PREFERRED EMBODIMENTS

Figure 1:
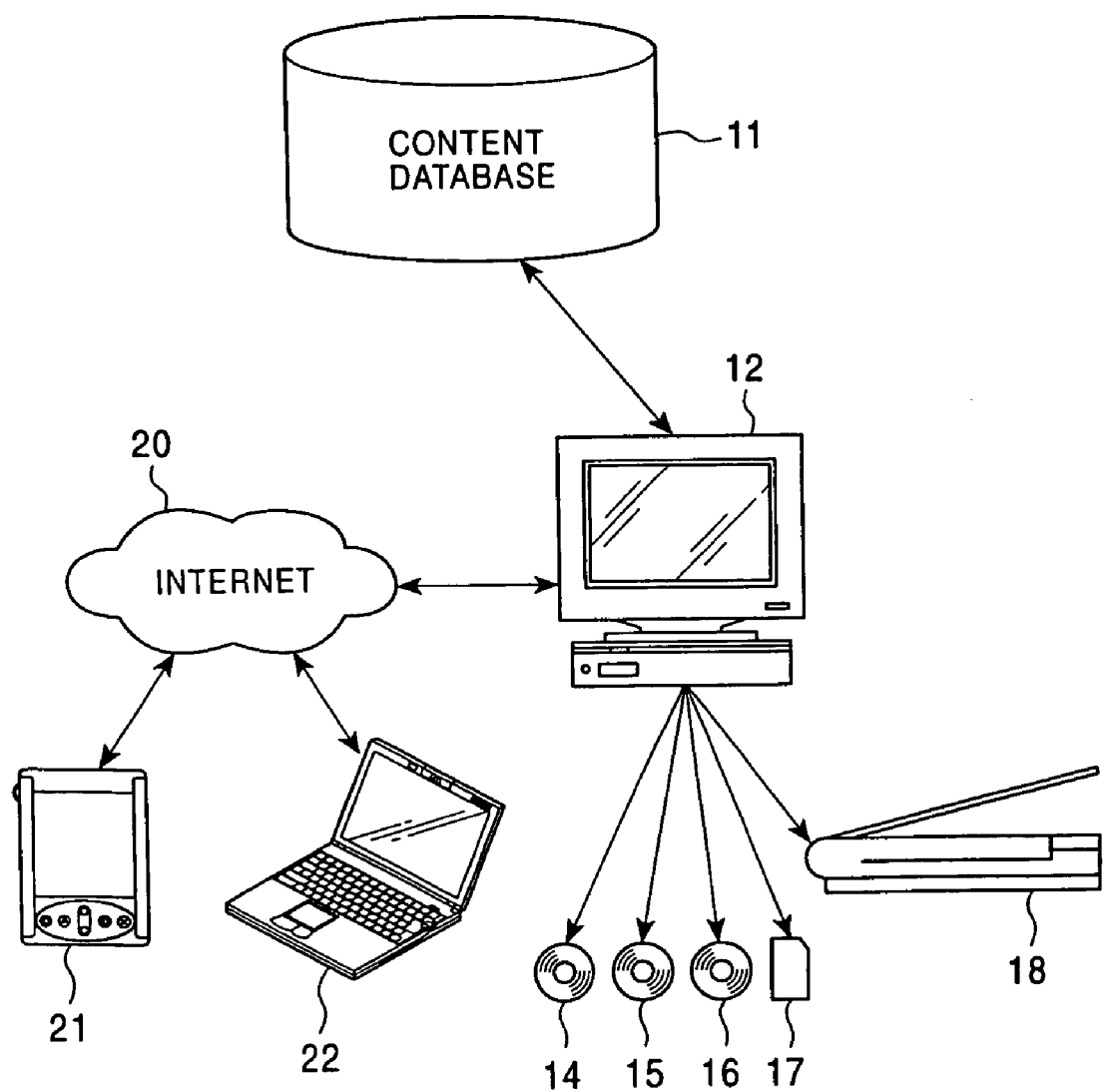
FIG. 1 is a diagram showing an electronic book providing system according to the present invention.

The present invention is described in further detail below with reference to preferred embodiments in conjunction with the accompanying drawings.

First, an electronic book providing system is described with reference to FIG. 1.

In a content database 11, content data of various electronic books, such as an electronic dictionary, are stored in the form of files according to a predetermined format.

The content data is described in a markup language such as XML (eXtensible Markup Language) and includes not only information to be played back or displayed as an electronic book but also a command used in playing back or displaying the electronic book. The content data may further include a command for referring to another content data, as required. In XML, unlike HTML (Hyper Text Markup Language) in which the markup method is fixed, the markup method can be defined by a user, and a document structure can be described in a simple format. Furthermore, in XML, a tag can also be defined by a user, and data can be flexibly described in a form which can be easily understood by users.

A personal computer 12 may read content data described in XML from the content database 11 into a storage medium such as a magnetic disk 14, an optical disk 15, a magnetooptical disk 16, or a semiconductor memory 17 (e.g., memory stick (trademark)) The personal computer 12 may transfer content data of an electronic book to an electronic book player 18 serving as an apparatus dedicated to playing back electronic books, which may store the received content data in an internal memory.

The content data stored in the personal computer 12 can be downloaded via the Internet 20 to, for example, a PDA 21 or a personal computer 22 of a user.

Figure 12:
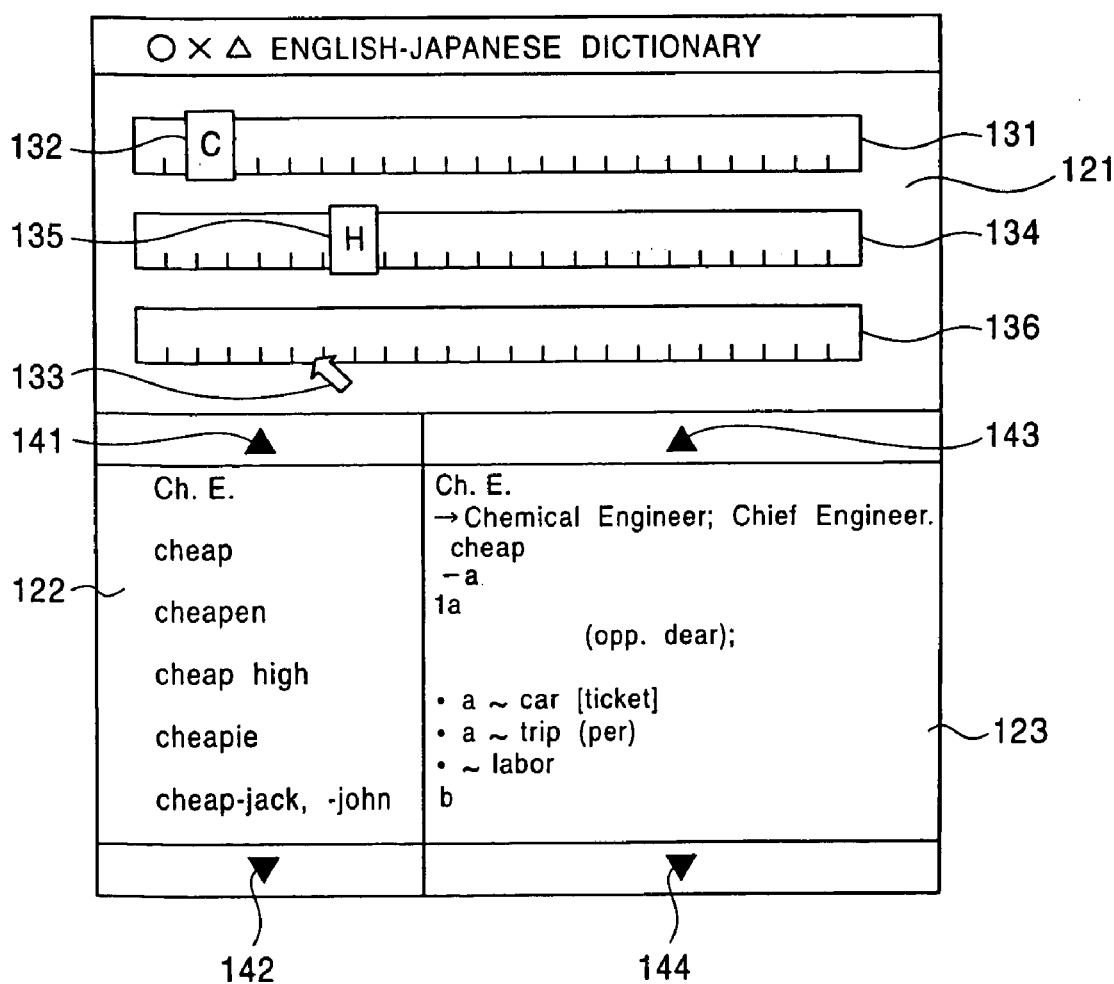
FIG. 12 is a diagram showing a GUI.

Although only one personal computer 12 is shown in FIG. 12, there may be two or more similar personal computers 12. In a case in which there are a plurality of electronic publishers, personal computers managed by the respective electronic publishers may be connected to the Internet 20.

A storage medium such as a magnetic disk 14, an optical disk 15, a magnetooptical disk 16, or a semiconductor memory 17 is mounted on the PDA 21, the personal computer 22, the electronic book player 18, or the like, of an individual user.

Content data downloaded from the personal computer 12 via the Internet and stored in the internal memory of the PDA 21 or the personal computer 22, or content data of an electronic book stored in a storage medium (such as the magnetic disk 14, the optical disk 15, the magnetooptical disk 16, or the semiconductor memory 17) mounted on the PDA 21 or the personal computer 22 can be displayed on a display device or a touchpanel thereof.

In the electronic book player 18, content data originally stored in its internal memory or content data stored by a user into its internal memory, or content data in the form of an electronic book stored in a storage medium mounted on the electronic book player 18 can be displayed on a display panel. Content data may also be downloaded from the personal computer 12 into the electronic book player 18 via the Internet 20.

Figure 2:
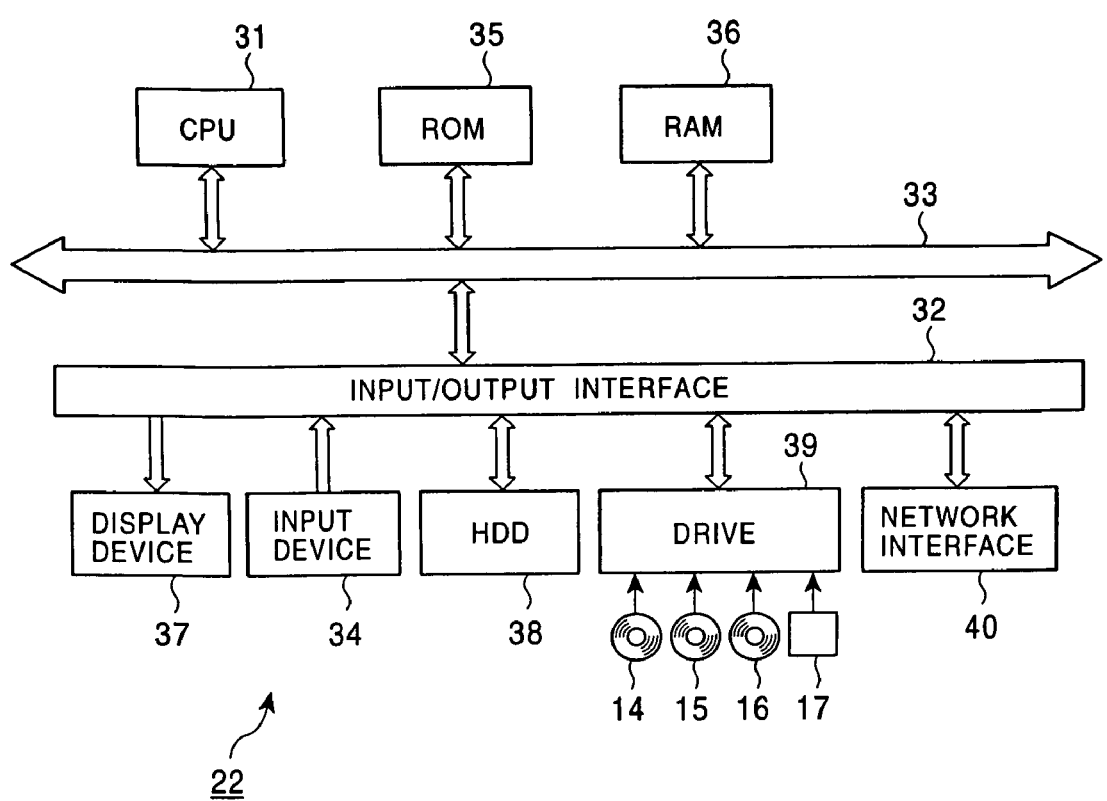
FIG. 2 is a block diagram showing a construction of a personal computer shown in FIG. 1.

FIG. 2 is a block diagram showing the construction of the personal computer 22 shown in FIG. 1.

A CPU (Central Processing Unit) 31 receives, via an input/output interface 32 and an internal bus 33, various signals corresponding to commands input by a user using an input device 34, or receives, via a network interface 40, a control signal transmitted from another personal computer (e.g., the personal computer 22), and performs various processes depending on the received signals. A ROM (Read Only Memory) 35 stores a program executed by the CPU 31. Of various parameters used in the operation performed by the CPU 31, those which are substantially fixed are also stored in the ROM 35. A RAM (Random Access Memory) 36 stores a program executed by the CPU 31 and also stores varying parameters used in the execution of the program. The CPU 31, the ROM 35, and the RAM 36 are connected to each other via the internal bus 33.

The internal bus 33 is also connected to the input/output interface 32. The input device 34 is used by a user to input various commands to the CPU 31, and specific examples thereof include a keyboard, a touchpad, a jog dial, and a mouse. A display device 37 displays various kinds of information in the form of a text or an image, and specific examples thereof include a CRT (Cathode Ray Tube) and a liquid crystal display device.

An HDD (Hard Disk Drive) 38 drives a hard disk to write or read a program executed by the CPU 31 or other information. A magnetic disk 14, an optical disk 15, a magnetooptical disk 16, or a semiconductor memory 17 is mounted on the drive 39 as required, and data is written or read to/from such a storage medium.

The network interface 40 is connected to another device (e.g., the personal computer 12) via a particular cable, a wireless communication line, or the Internet 20 so as to communicate with that device.

Those parts from the input device 34 to the network interface 40 are connected to the CPU 31 via the input/output interface 32 and the internal bus 33.

The personal computer 12 shown in FIG. 1 is configured in a similar manner to the personal computer 22 described above with reference to FIG. 2, and thus the configuration of the personal computer 12 is not described in further detail herein.

Figure 3:
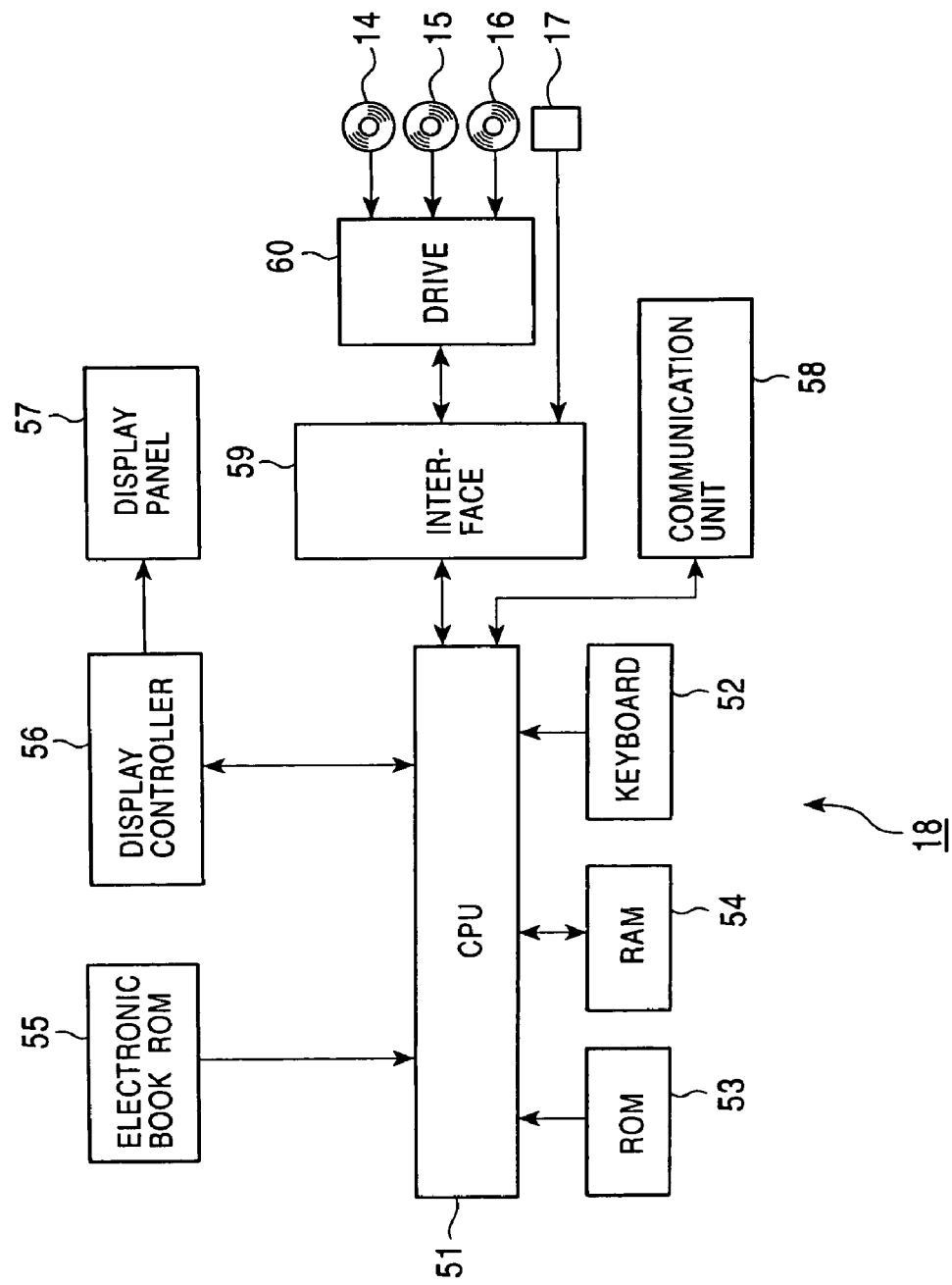
FIG. 3 is a block diagram showing a construction of an electronic book player shown in FIG. 1.

FIG. 3 is a block diagram showing the construction of the electronic book player 18 shown in FIG. 1.

The CPU (Central Processing Unit) 51 performs various processes in accordance with signals corresponding to various commands input by a user using a keyboard 52 or in accordance with control signals received via the communication unit 58. A ROM (Read Only Memory) 53 stores a program executed by the CPU 51. Of various parameters used in the operation performed by the CPU 51, those which are substantially fixed are also stored in the ROM 53. A RAM (Random Access Memory) 54 stores a program executed by the CPU 51 and also stores varying parameters used in the execution of the program.

An electronic book ROM 55 stores content data of an electronic book such as an electronic dictionary directly input from the personal computer 12 or downloaded from the personal computer 12 via the Internet 20 and the communication unit 58.

A display controller 56 displays, under the control of the CPU 51, various kinds of information in the form of a text or an image on a display panel 57. The display device 57 displays, under the control of the display controller 56, various kinds of information in the form of a text or an image. As for the display device 57, a CRT (Cathode Ray Tube) or a liquid crystal display device may be employed.

A interface 59 is connected to a drive 60 and a semiconductor memory 17, and data is transferred via the interface 59 to/from the drive 60 or the semiconductor memory. A magnetic disk 14, an optical disk 15, or a magnetooptical disk 16 is mounted on the drive 60 as required, and data is written/read to/from such a storage medium.

To transmit/receive information, the communication unit 58 accesses the personal computer 12 via the Internet 20, retrieves necessary information from the personal computer 12, and downloads the retrieved information.

Figure 4:
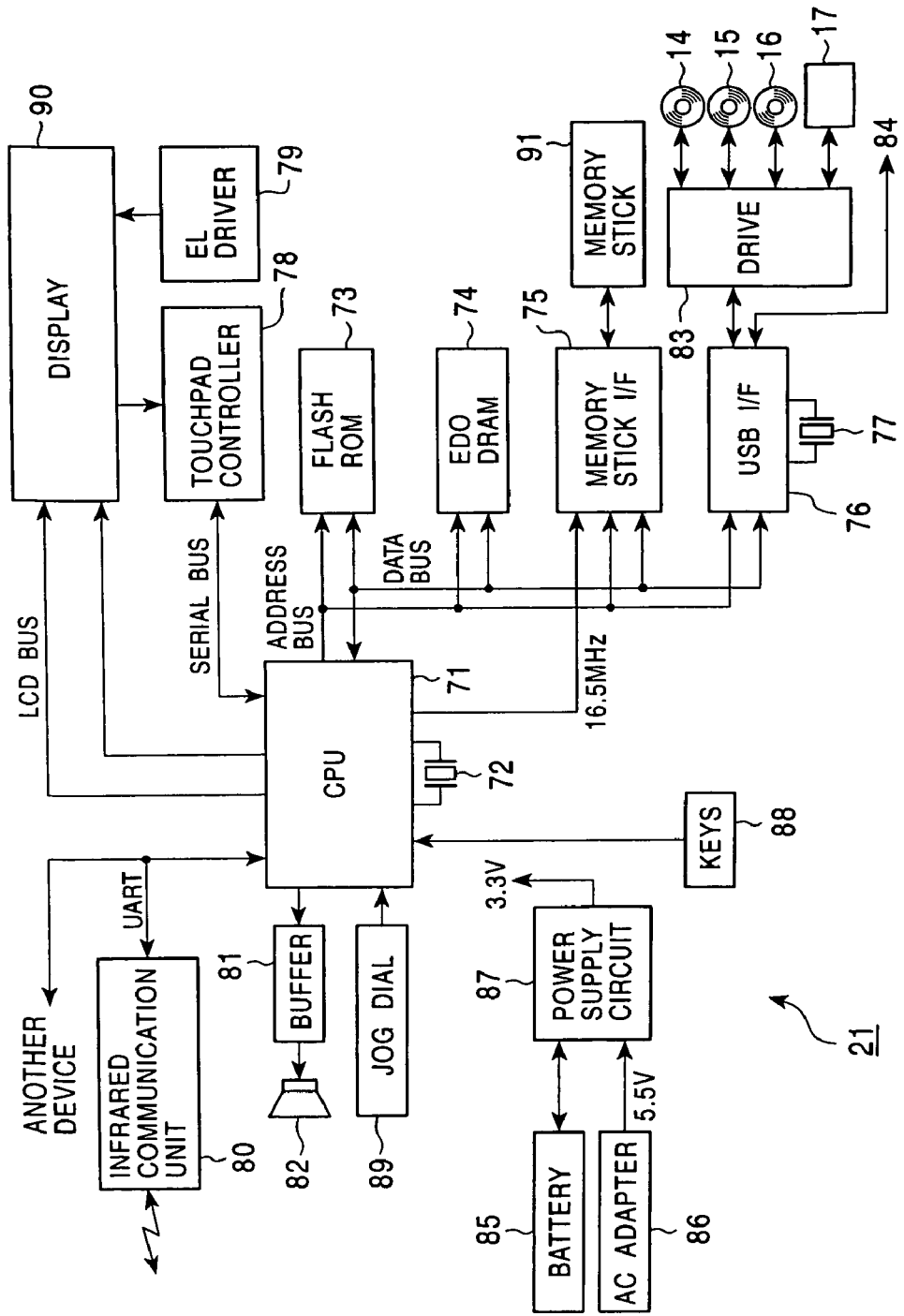
FIG. 4 is a block diagram showing a construction of a PDA shown in FIG. 1.

The internal structure of the PDA 21 is described below with reference to FIG. 4.

In synchronization with a clock signal supplied from an oscillator 72, a CPU (Central Processing Unit) 71 executes various programs such as an operating system or a developed application program, stored in a flash ROM (Read Only Memory) 73 or EDO DRAM (Extended Data Out Dynamic Random Access Memory) 74.

The flash ROM 73 is formed of a flash memory, which is one type of EEPROMs (Electrically Erasable Programmable Read Only Memories), and is generally used to store a program used by the CPU 71 and also store, of various parameters used in a computing operation, those parameters which are basically fixed. An EDO DRAM 74 stores a program executed by the CPU 71 and also stores varying parameters used in the execution of the program.

A memory stick interface 75 reads data from a memory stick 91 mounted on the PDA 21 and also writes data supplied from the CPU 71 into the memory stick 91.

In synchronization with the clock signal supplied from the oscillator 77, a USB (Universal Serial Bus) interface 76 inputs data or a program from a drive 83, which is a USB device connected to the USB interface 76, and supplies data supplied from the CPU 71 to the drive 83. In synchronization with the clock signal supplied from the oscillator 77, the USB (universal Serial Bus) interface 76 also inputs data or a program from a cradle 84, which is another USB device connected to the USB interface 76, and supplies data supplied from the CPU 71 to the cradle 84.

The cradle 84 is a docking station serving to connect the PDA 21 and the personal computer via a cable and synchronizes data transmitted between them by means of hot sync.

The USB interface 76 is also connected to the drive 83. The drive 83 reads data or a program from a magnetic disk 14, an optical disk 15, a magnetooptical disk 16, or a semiconductor memory 17, mounted on the drive 83, and supplies the read data or program, via the USB interface 76, to the CPU 71 or the EDO DRAM 74, which is connected to the USB interface 76. The drive 83 writes data or a program supplied from the CPU 71 into the magnetic disk 14, the optical disk 15, the magnetooptical disk 16, or the semiconductor memory 17, mounted on the drive 83.

The PDA 21 can be connected to a cellular phone or a PHS (Personal Handyphone System) to access the personal computer 12 via the Internet 20.

The flash ROM 73, the EDO DRAM 74, the memory stick interface 75, and the USB interface 76 are connected to the CPU 71 via an address bus and a data bus.

The display device 90 receives data from the CPU 71 via an LCD bus and displays an image or a character corresponding to the received data. If a touchpad disposed on the display device 90 is operated, a touchpad controller 78 receives data corresponding to the operation performed on the touchpad (e.g., data indicating the coordinates of a touched point) from the display device 90 and supplies a signal corresponding to the received data to the CPU 71 via a serial bus.

To control the brightness of the display device 90, an EL (Electroluminescence) driver 79 drives an electroluminescence device disposed on the backside of the liquid crystal display part of the display device 90.

If an infrared communication unit 80 receives data from the CPU 71, the infrared communication unit 80 transmits, using an infrared ray as a communication medium, the received data to another device (not shown) via a UART (Universal Asynchronous Receiver Transmitter). On the other hand, if the infrared communication unit 80 receives infrared-ray data transmitted from another device, the infrared communication unit 80 supplies the received data to the CPU 71. This allows the PDA 21 to communicate with another device via the UART.

An audio data playback unit 82 includes a speaker and an audio data decoding circuit, and serves to decode or reproduce audio data originally stored in the PDA 21 or audio data received via the Internet 20 and generate a sound/voice corresponding to the audio data. More specifically, for example, the audio data playback unit 82 generates a sound/voice corresponding to audio data received from the CPU 71 via a buffer 81.

Keys 88 including input keys are used by a user to input various commands to the CPU 71.

If a rotating operation or a pressure is applied to a jog dial 89, the jog dial 89 supplies data corresponding to the applied operation to the CPU 71.

A power supply circuit 87 converts a voltage supplied from a battery 85 mounted on the PDA 21 or an AC (Alternating Current) adapter 86 connected to the PDA 21, and the power supply circuit 87 supplies a resultant voltage to various parts from the CPU 71 to the audio data playback unit 82.

Referring now to a functional block diagram shown in FIG. 5, an operation of retrieving information from an electronic dictionary using the electronic book player 18, the PDA 21, or the personal computer 22 is described below.

Figure 5:
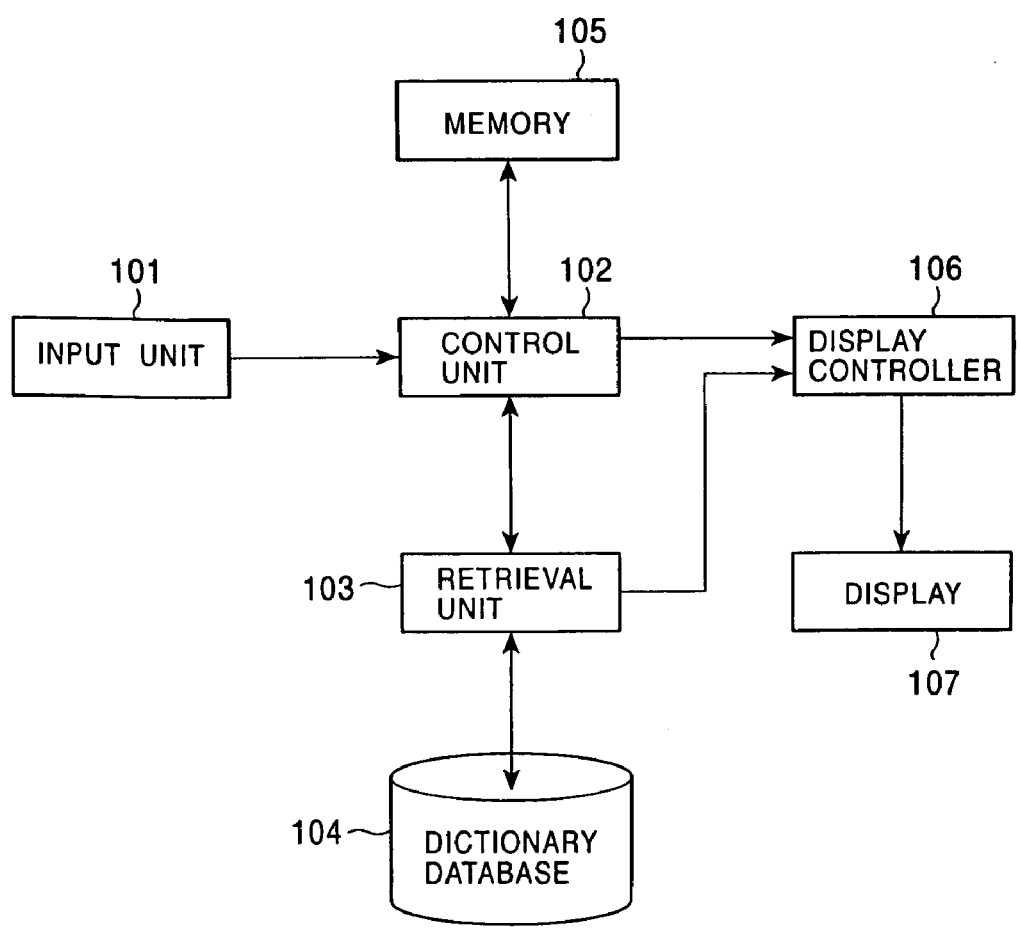
FIG. 5 is a functional block diagram associated with a dictionary retrieval process according to the present invention.

In FIG. 5, an input device 101 corresponds to the input device 34 of the personal computer 22, the keyboard 52 of the electronic book player 18, the touchpad of the display device 90 of the PDA 21, the jog dial 89, or other types of input devices. If an inputting operation is performed on the input device 101 by a user, the input device 101 outputs a signal corresponding to the inputting operation to a control unit 102.

In accordance with the signal indicating the operation performed, by the user, on the input device 101, the control unit 102 controls a retrieval unit 103 so as to retrieve specific data from a dictionary database 104, controls a display controller 106 so as to display information on a display unit 107, and stores information necessary in retrieval of information from an electronic dictionary into a memory 105.

The memory 105 includes a register for retaining information necessary in the retrieval process, and temporarily stores various kinds of data used in the retrieval process.

Under the control of the control unit 102, the retrieval unit 103 retrieves specified data from dictionary data stored in the dictionary database 104 and outputs the retrieved data to the display controller 106. The dictionary database 104 serves to store the electronic dictionary data and is realized on a storage device disposed in an apparatus, such as the RAM 36 of the personal computer 22, the electronic book ROM 55 of the electronic book player 18, or the EDO RAM 74 of the PDA 21, or is realized on a storage medium mounted on the apparatus, such as the magnetic disk 14, the optical disk 15, the magnetooptical disk 16, the semiconductor memory 17, or the memory stick 91.

Under the control of the control unit 102, the display controller 106 displays a GUI screen (described in detail later) for use in retrieval on the display unit 107 and displays a result of retrieval received from the retrieval unit 103 on the GUI screen. The display unit 107 for displaying the GUI screen or the retrieval result under the control of the display controller 106 corresponds to the display device 37 of the personal computer 22, the display panel of the electronic book player 18, or the display unit 90 of the PDA 21.

Now, referring to a flow chart shown in FIG. 6, a first retrieval process performed by the electronic book player 18, the PDA 21, or the personal computer 22 is described below.

In step S1, the control unit 102 sets the value of n to 1, wherein n indicates the number of first-type page bars used by a user to input a word to be retrieved. The control unit 102 then displays a frame of a display screen (that is a window frame including no page bars (described later) and no retrieval result).

In step S2, the control unit 102 generates a control signal for causing an nth page bar of the first type to be displayed, and outputs the generated control signal to the display controller 106. The display controller 106 controls the display device 107 to display the nth page bar of the first type. In step S3, the control unit 102 generates a control signal for causing a display window to be displayed at an initial position and causing a corresponding character or a space to be displayed in the display window. The control unit 102 outputs the generated control signal to the display controller 106. The display controller 106 controls the display unit 107 so as to display the display window at the initial position and also display the corresponding character or a space in the display window.

In step S4, the control unit 102 controls the retrieval unit 103 so as to forwardly search the dictionary database 104 in accordance with the characters displayed in the respective n display windows. A retrieved entry (index) obtained as a result of the retrieval, a predetermined number of entries directly following the retrieved entry, and a part of a main body corresponding to the retrieved entry are output to the display controller 106. The display controller 106 controls the display unit 107 so as to display the received entries and the main body.

Figure 7:
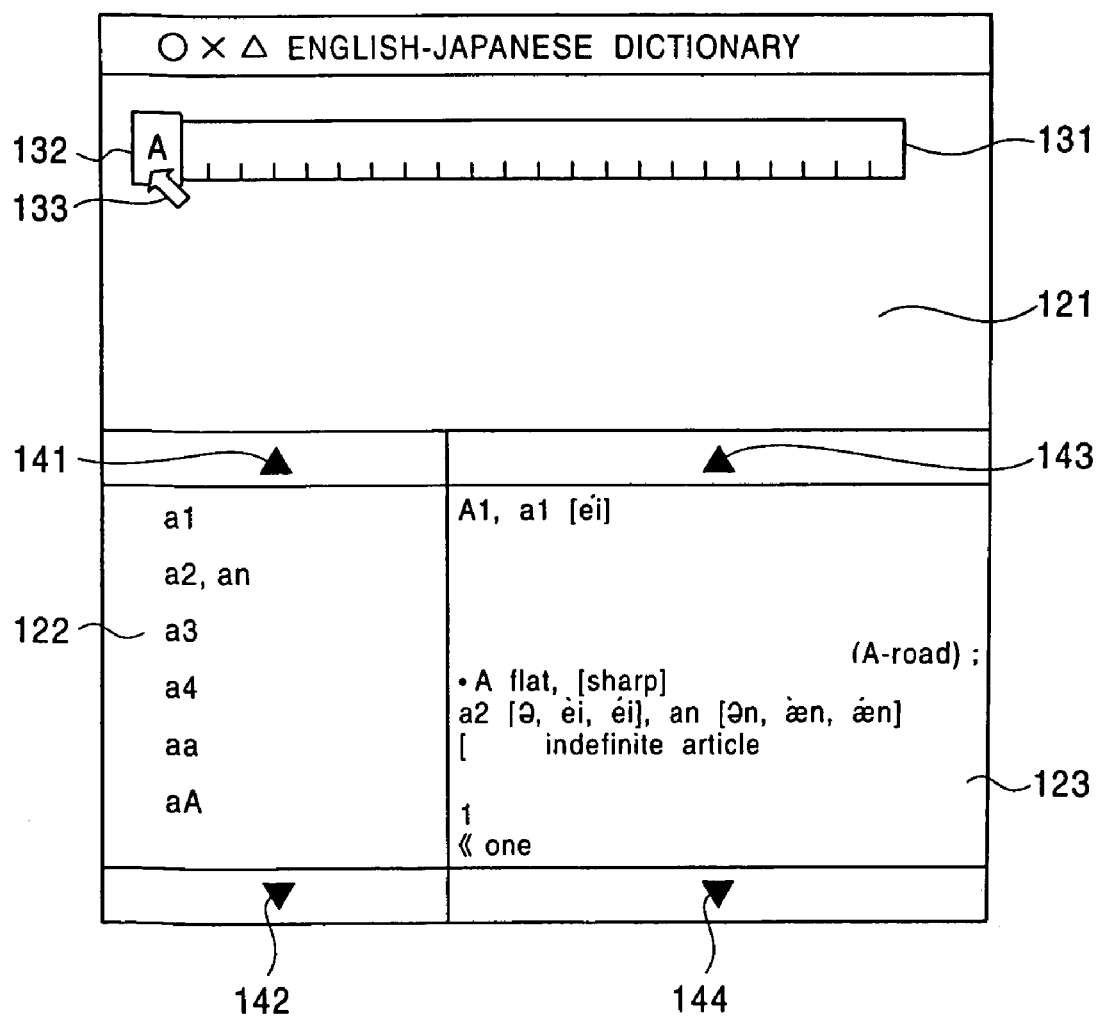
FIG. 7 is a diagram showing a GUI.

FIG. 7 shows an initial screen for n=1. A first page bar 131 is displayed in a page bar display area 121, and the display window 132 is displayed on the page bar 131. In a case where retrieval is performed from an English-to-Japanese dictionary or an English dictionary, a first character of the alphabet, that is, "A", is displayed in the display window. On the other hand, in a case where retrieval is performed from a Japanese dictionary or a Japanese-to-English dictionary, a first character of Hiragana (the Japanese alphabet) is displayed.

The position of the display window 132 is changed along the page bar 131 in response to an operation performed by a user. That is, the user can move the display window 132 to an arbitrary position by moving a cursor 133 using a mouse, a touchpad, or a jog dial. The cursor 133 may not be displayed. In this case, the display window 132 may be moved in response to a pressing operation applied to an arrow key or a rotating operation applied to a jog dial.

The entries retrieved in step S4 are displayed in an entry display area 122, and the main body retrieved in step S4 is displayed in main body display area 123. By operating a button 141 or 142, the entries displayed in the entry display area 122 can be scrolled in a forward or backward direction. Similarly, by operating a button 143 or 144, the main body displayed in the main body display area 123 can be scrolled in a forward or backward direction.

The number of entries displayed in the entry display area 122 and the data size of the main body displayed in the main body display area 123 are determined depending on the size of the respective display areas and the fonts employed. For example, in a case in which up to six entries are displayed in the entry display area 122, six entries of those retrieved in step S4 are displayed in the entry display area 122, and the maximum possible size of data of the main body corresponding to the retrieved entries is displayed in the main body display area 123.

A user may be allowed to set the size of the entry display area 122, the size of the main body display area 123, and the fonts of characters. In this case, the control unit 102 calculates the number of entries to be displayed and the data size to be displayed in the main body display area 123 in accordance with the setting performed by the user, and the control unit 102 supplies the result to the retrieval unit 103. In accordance with the result, supplied from the control unit 102 and indicating the number of entries to be displayed and the data size to be displayed in the main body display area 123, the retrieval unit 103 retrieves a specified number of entries and corresponding main bodies, and outputs the retrieved data to the display controller 106.

When the display screen is very small in size, it may be desirable not to display the entries and the main body but to increase the size of the page bar display area 121 so as to improve the operability for users. In such a case, one or both of the entry display area 122 and the main body display area 123 may not be displayed. In this case, a corresponding part of processing in step S4 is not performed. A user may be allowed to determine whether the entry display area 122 and the main body display area 123 should be displayed or not, and switch the operation mode so that they are displayed or not displayed.

In step S5, in accordance with the signal indicating the operation performed, by the user, on the input device 101, the control unit 102 determines whether a character being displayed in the nth display window (e.g., the first display window 132) has been finally selected. The selection of a character may be performed, for example, by double-clicking the mouse or the touchpad, pressing an Enter key, pressing the jog dial against the center thereof, or any other similar operation depending on the apparatus or the application.

If it is determined in step S5 that a final character selection is not performed yet, the process proceeds to step S6. In step S6, in accordance with the signal indicating the operation performed, by the user, on the input device 101, the control unit 102 determines whether it is commanded to move the position of the display window. The user may issue a command for moving the position of the display window by moving the cursor 133 using the mouse, the touchpad, or the jog dial. In this case, the display window may move in synchronization with the movement of the cursor 133. Alternatively, the cursor 133 may not be displayed, but the display window may be moved in response to pressing an arrow key or rotating the jog dial. In the case where it is determined in step S6 that it is not commanded to move the position of the display window, the process returns to step S5, and the above-described process is repeated.

If it is determined in step S6 that it is commanded to move the position of the display window, the process proceeds to step S7. In step S7, in accordance with the signal indicating the operation performed, by the user, on the input device 101, the control unit 102 generates a control signal for causing the position of the display window to be moved, and the outputs the generated control signal to the display controller 106. The display controller 106 controls the display unit 107 so as to move the position of the display window by a distance corresponding to the operation performed by the user.

In step S8, in accordance with the position of the display window moved in step S7, the control unit 102 generates a control signal for displaying a character corresponding to the position of the display window and outputs the generated control signal to the display controller 106. The display controller 106 controls the display unit 107 so as to display the specified character.

The position of the display window and the character displayed may be related as follows. For example, the length of the page bar is equally divided into as many segments as there are alphabetic characters, that is, 26, and alphabetic characters are assigned to respective segments. In this first method, although the manner of dividing the page bar depends on whether a Japanese word or an English word is retrieved, the manner does not depend on the individual dictionary. Thus, information indicating the manner of dividing the page bar may be stored in advance in the memory 105.

Alternatively, in analogy to a paper dictionary, the page bar may be divided into segments such that each segment has a width corresponding to the number of entries starting with an alphabetic character assigned to that segment. More specifically, for example, because there are large number of words starting with "A", a segment having a large width (large area) corresponding to the number of words starting with "A" is assigned to "A". On the other hand, there are relatively small number of words starting with "Q", and thus a segment having a small width (small area) corresponding to the number of words starting with "Q" is assigned to "Q". In this second method, the manner of dividing the page bar into segments depends on an individual dictionary used in retrieval, and thus the control unit 102 calculates, in step S8, the correspondence between the character displayed in the display window and the position on the page bar at which the display window is displayed, and the control unit 102 determines the character to be displayed.

In a case in which the number of entries starting with a particular alphabetic character is very small and thus the simple assignment of a corresponding small width to a segment for that alphabetic character makes it difficult for a user to select that alphabetic character, a lower limit may be set for the width of the segments assigned to the respective alphabetic characters.

In a case in which retrieval is performed across a plurality of dictionaries, it is more preferable to equally divide the page bar into segments regardless of the alphabetic characters in accordance with the first method, because this method makes it unnecessary to take into account the differences in numbers of entries among the dictionaries, and thus required processing becomes simple.

In step S9, the control unit 102 acquires the character displayed in the nth display window as an nth character and stores the acquired character into the memory 105.

In step S10, processing similar to step S4 is performed, and the processing flow returns to step S5 to repeat the process described above.

Figure 8:
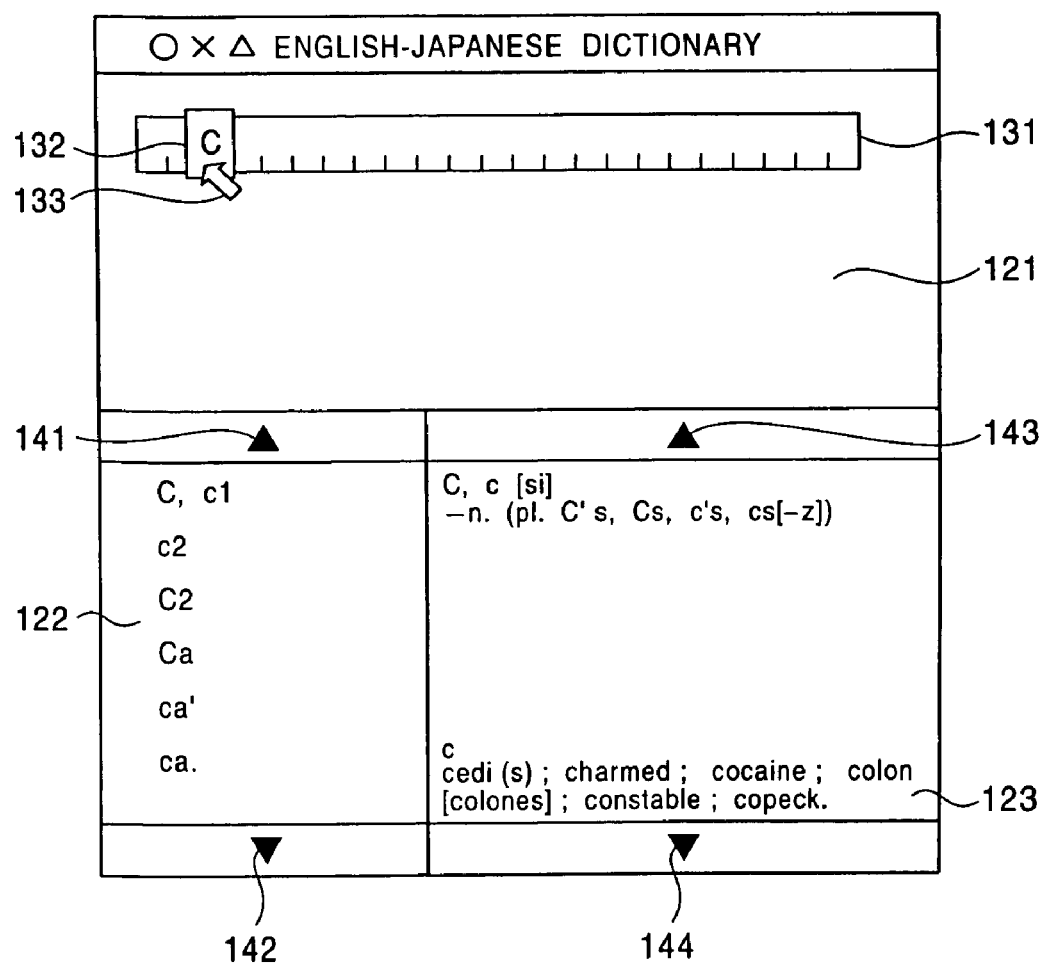
FIG. 8 is a diagram showing a GUI.

FIG. 8 shows an example of the display screen, in which the first display window 132 has been moved to a certain position on the page bar 131.

If the display window 132 is moved in response to an operation performed by a user, a character corresponding to the position of the display window 132 is displayed in the display window 132. In this specific example, a character "C" is displayed in the display window 132, the predetermined number of entries starting with "C" are displayed in the entry display area 122, and a main body of an entry starting with "C" is displayed in the main body display area 123.

In the case in which it is determined in step S5 that a character has been selected, the process jumps to step S11. In step S11, the control unit 102 determines whether the number, n, of first-type page bars being currently displayed is smaller than the maximum number of first-type page bars that can be displayed.

If it is determined in step S11 that the number, n, of first-type page bars being currently displayed is smaller than the maximum number of first-type page bars that can be displayed, the process proceeds to step 12. In step S12, the control unit 102 increments the value of the register indicating the number of first-type page bars such that n=n+1, and the process flow returns to step S2 to repeat the process described above.

Figure 9:
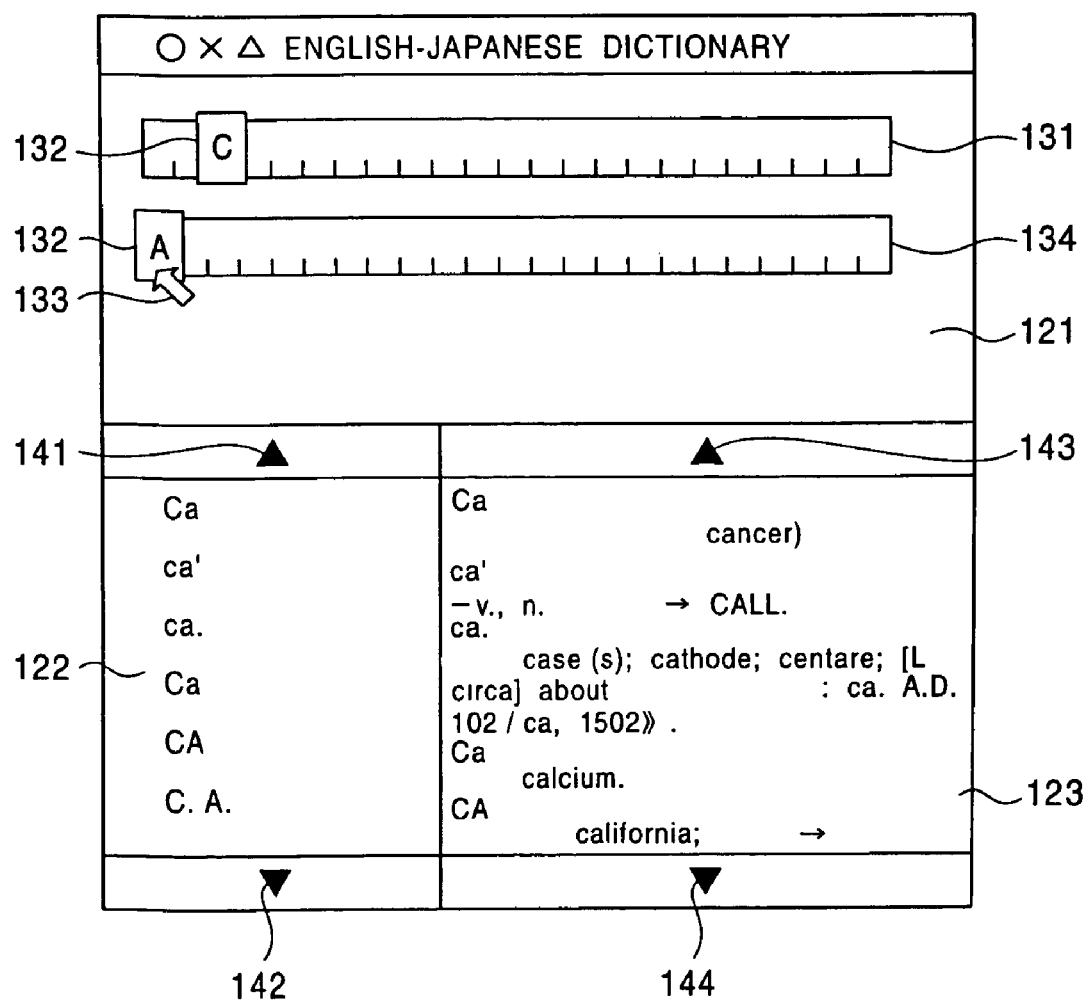
FIG. 9 is a diagram showing a GUI.

FIG. 9 shows an example of the display screen that is displayed when n=2. A new page bar 134 is displayed below the page bar 131, and a display window 135 is displayed at the leftmost position on the page bar 134. The cursor 133 has been moved from the position near the display window 132 to a position near the display window 135. In a case in which the cursor 133 is not used to move the display window 132 or the display window 135, it is possible to indicate which display window is currently processed, by reversing, in intensity, the character displayed in the display window being currently processed or by reducing the brightness of the display window that is not currently processed.

In an initial state, a character "A" is displayed in the display window 135, and thus forward retrieval is performed using "CA" as a retrieval key. The predetermined number of entries starting with "ca" are displayed in the entry display area 122, and a corresponding main body is displayed in the main body display area 123.

In the specific example shown in FIG. 9, "A" is displayed in the display window 135 in the initial state. However, there is a possibility that a word having no second character following the first character is retrieved. Thus, in the initial state, taking into account the above, no character may be displayed in the second and following display windows.

Figure 10:
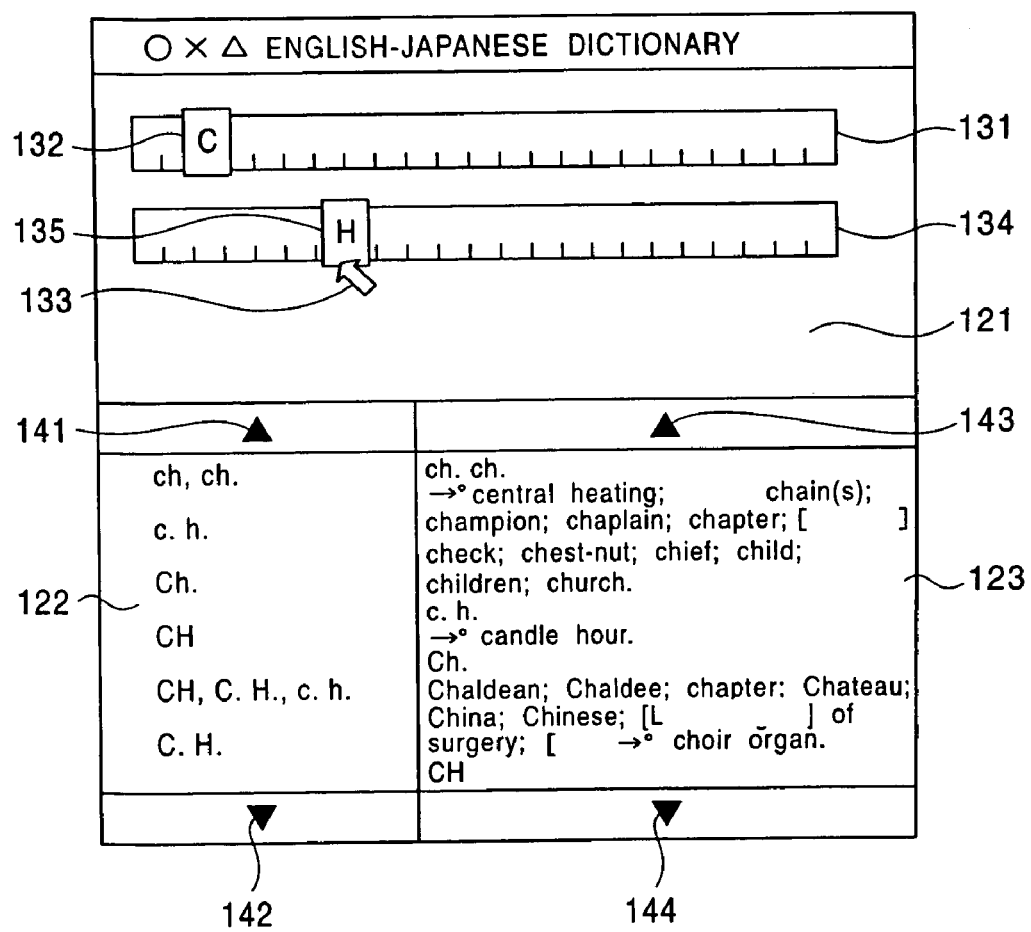
FIG. 10 is a diagram showing a GUI.

For example, if the position of the display window 135 is moved until a character "H" is displayed therein as shown in FIG. 10, forward retrieval is performed using "CH" as a retrieval key. As a result, the predetermined number of entries starting with "ch" are displayed in the entry display area 122, and a corresponding main body is displayed in the main body display area 123.

In a case in which it is determined in step S11 that the number, n, of first-type page bars being currently displayed is not smaller than the maximum number of first-type page bars that can be displayed, the process jumps to step S13, in which the control unit 102 generates a control signal for causing a second first-type page bar to be displayed, and outputs the generated control signal to the display controller 106. The display controller 106 controls the display device 107 to display the second page bar. Then, in step S14, the control unit 102 generates a control signal for causing the cursor 133 to be displayed at an initial position on the side of the second page bar, and the control unit 102 outputs the generated control signal to the display controller 106. The display controller 106 controls the display device 107 to display the cursor 133 at the initial position on the side of the second page bar.

Figure 11:
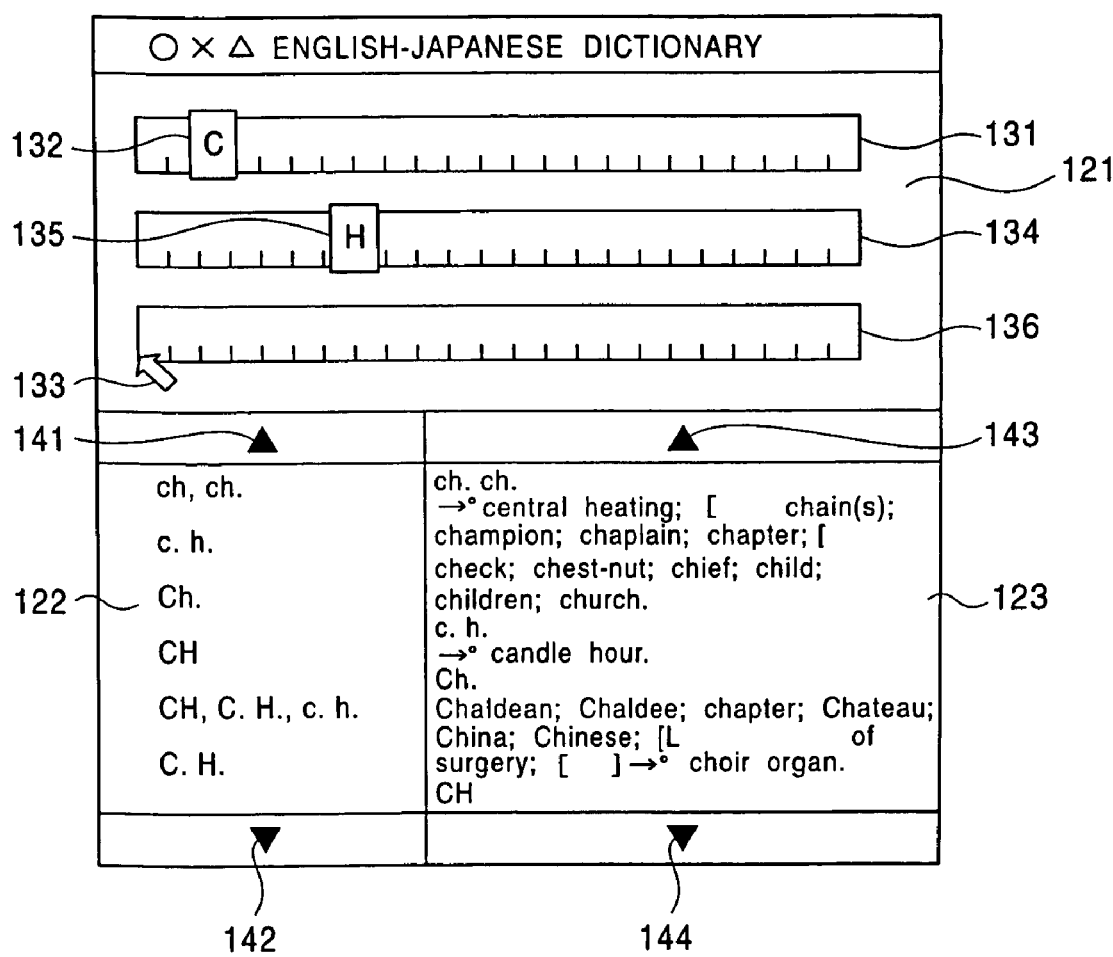
FIG. 11 is a diagram showing a GUI.

FIG. 11 shows an example of the display screen including the second page bar being displayed, wherein the maximum number of page bars of the first type is two. For the second page bar 136, as with the page bar 131 or the page bar 134, it may be equally divided into as many segments as there are alphabetic characters, and the display window may be displayed on one of segments. However, in this case, there is a possibility that, for example, "q" is displayed in the display window although there is no words having "q" at the third place following "ch". Such a retrieval screen is not convenient for users. In view of the above, no display window may be displayed on the second page bar 136, and only the cursor 133 may be displayed. In this case, the position of the cursor 133 may be moved in response to an inputting operation performed by a user.

In this case, dividing the second page bar 136 into segments and relating the segments to entries to be retrieved may be performed as follows. For example, the second page bar 136 is equally divided into as many segments as there are entries starting with "ch", and the segments are assigned to the respective entries so that the position on the page bar 136 can be determined in accordance with an entry. Alternatively, entries starting with "ch" are grouped such that each group includes a predetermined number of entries (for example, the number of entries included in each group may be set to be equal to the number of entries that can be displayed at a time in the entry display area 122), and the second page bar 136 may be equally divided into as many segments as there are groups, and the segments are assigned to the respective groups so that the position on the page bar 136 can be determined in accordance with a group.

In step S15, in accordance with a signal indicating an operation performed, by a user, on the input device 101 (command for moving the cursor position), the control unit 102 controls the retrieval unit 103 so as to search the dictionary database 104 for an entry corresponding to the concatenation of the characters being currently displayed in the n display windows and the position of the cursor 133 on the second page bar 136. The retrieved entry (index), a predetermined number of entries directly following the retrieved entry, and a main body corresponding to the retrieved entry are output to the display controller 106. The display controller 106 controls the display unit 107 so as to display the received entries and the main body.

In step S16, in accordance with a signal indicating an operation performed, by the user, on the input device 101, the control unit 102 determines whether the cursor position has been fixed. Fixing the cursor position may be performed in a similar manner to selecting a character, described earlier with reference to step S5. More specifically, for example, the cursor position can be fixed by double-clicking the mouse or the touchpad, pressing the Enter key, pressing the jog dial against the center thereof, or any other similar operation depending on the apparatus or the application.

In a case in which it is determined in step S16 that the position of the cursor 133 has not been fixed yet, the process proceeds to step S17. In step S17, in accordance with the signal indicating the operation performed, by the user, on the input device 101, the control unit 102 determines whether it is commanded to move the position of the cursor 133. The method of moving the position of the cursor 133 by the user may be similar to the that of moving the position of the display window described earlier with reference to step S6. More specifically, for example, the user can move the position of the cursor 133 by using the mouse, the touchpad, or the jog dial. The cursor 133 may not be displayed. In this case, the color of the page bar 136 may be partly changed from left to right in response to pressing an arrow key or rotating the jog dial. If it is determined in step S17 that it is not commanded to move the position of the cursor 133, the process flow returns to step S16 to repeat the process described above.

In a case in which it is determined in step S17 that it is commanded to move the position of the cursor 133, the process proceeds to step S18. In step S18, in accordance with a signal indicating an operation performed, by the user, on the input device 101, the control unit 102 generates a control signal for causing the position of the cursor 133 to be moved, and the outputs the generated control signal to the display controller 106. The display controller 106 controls the display device 107 so as to move the position of the cursor 133. The processing flow then returns to step S15 to repeat the process described above.

FIG. 12 shows an example of the display screen, in which the cursor 133 has been moved to a certain position on the page bar 136.

In accordance with the operation performed by the user, the control unit 102 moves the position of the cursor 133 being displayed. Furthermore, in accordance with the position of the cursor 133, the control unit 102 controls the retrieval unit 103 so as to retrieve entries to be displayed in the entry display area 122 and a main body to be displayed in the main body display area 123 from the dictionary database 104. The retrieved data is output to the display controller 106, which in turn controls the display device 107 to display the retrieved data.

Figure 13:
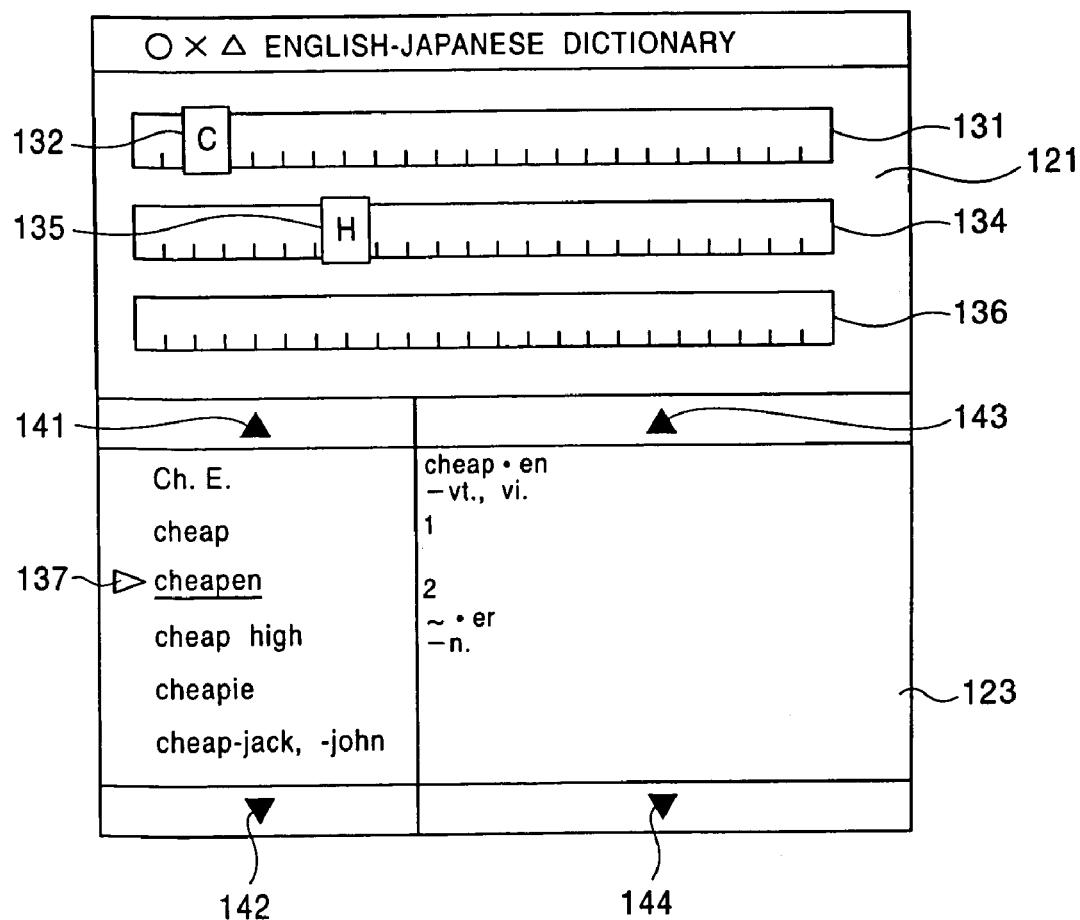
FIG. 13 is a diagram showing a GUI.

In a case in which it is determined in step S16 that the position of the cursor 133 has been fixed, the process proceeds to step S19. In step S19, as shown in FIG. 13, the control unit 102 moves the cursor into the entry display area 122, and the entire process is completed. In a case in which the entry display area 122 or the main body display area 123 is not displayed during the retrieval process, the entry display area 122 or the main body display area 123 is displayed in step S19.

In step S19, the cursor 137 is displayed so that a user can select an entry from those displayed in the entry display area 122. A selected entry may be underlined or reversed in intensity. The user can select a desired entry by moving the cursor 137 displayed in the entry display area 122 to a position corresponding to the desired entry. A main body corresponding to the entry pointed to by the cursor 137 is displayed in the main body display area 123.

By performing the process described above, the user can easily retrieve an entry from the dictionary without having to use the keyboard to input characters corresponding to the entry. The GUI used in the dictionary retrieval is very simple. In a mode in which the entry display area 122 and the main body display area 123 are not displayed, only two characters are displayed on the display screen, and thus the characters can have a large enough size to easily read, even if the display screen of the apparatus is very small in size.

If the main body display area 123 is displayed during the retrieval process and a main body corresponding to an entry being currently retrieved is displayed in the main body display area 123, the user can retrieve information from the dictionary in a very similar manner to retrieval from a conventional paper dictionary.

In the present embodiment, the maximum number of first-type page bars is two, the maximum number may be one, or, conversely, three or more. The second-type page bar may not be used, and retrieval may be perform using only the first-type page bars.

In a case in which it is desired to display the entry display area 122 or the main body display area 123 although the display screen is small in size, or in a case in which it is desired to further reduce the size of the page bar display area 121 because the display screen is very limited in size, the page bars 131 ad 134 may not be displayed.

Figure 14:
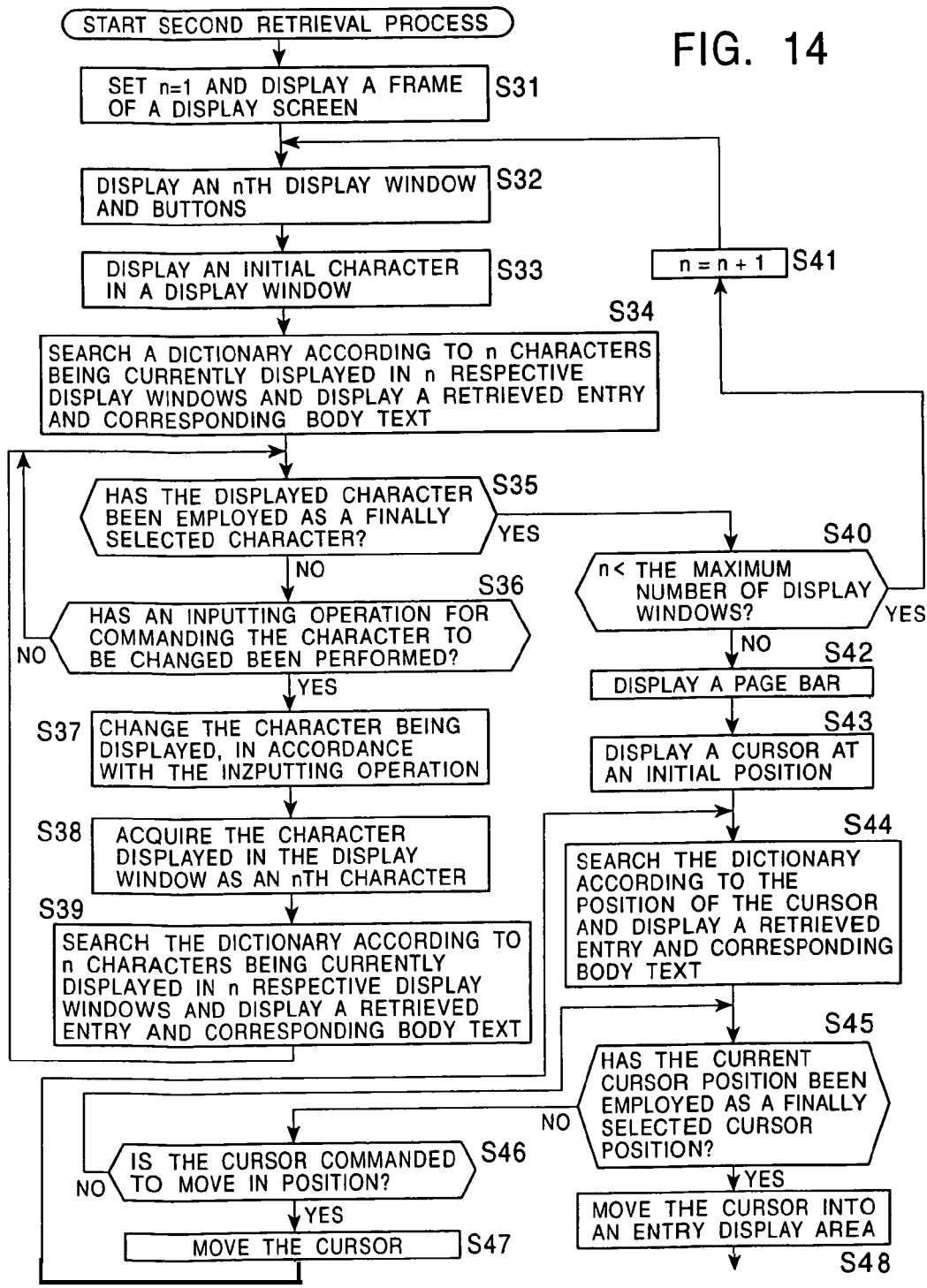
FIG. 14 is a flow chart showing a second retrieval process.

Now referring to a flow chart shown in FIG. 14, a second retrieval process performed by the electronic book player 18, the PDA 21, or the personal computer 22 without displaying the page bars 131 and 134 is described below.

In step S31, the control unit 102 sets the value of a register indicating the number of display windows such that n=1, and the control unit 102 displays a frame of a display screen (that is a window frame including no page bars and no retrieval result).

In step S32, the control unit 102 generates a control signal for displaying an nth display window and buttons to be pressed by a user when the user wants to change a character displayed in the display window. The generated control signal is supplied to the display controller 106. The display controller 106 controls the display unit 107 so as to display the nth display window and the buttons. Then, in step S33, the control unit 102 generates a control signal for displaying an initial character and outputs the generated control signal to the display controller 106. The display controller 106 controls the display unit 107 so as to display the display window at a predetermined initial position and display the initial character in the display window.

Figure 6:
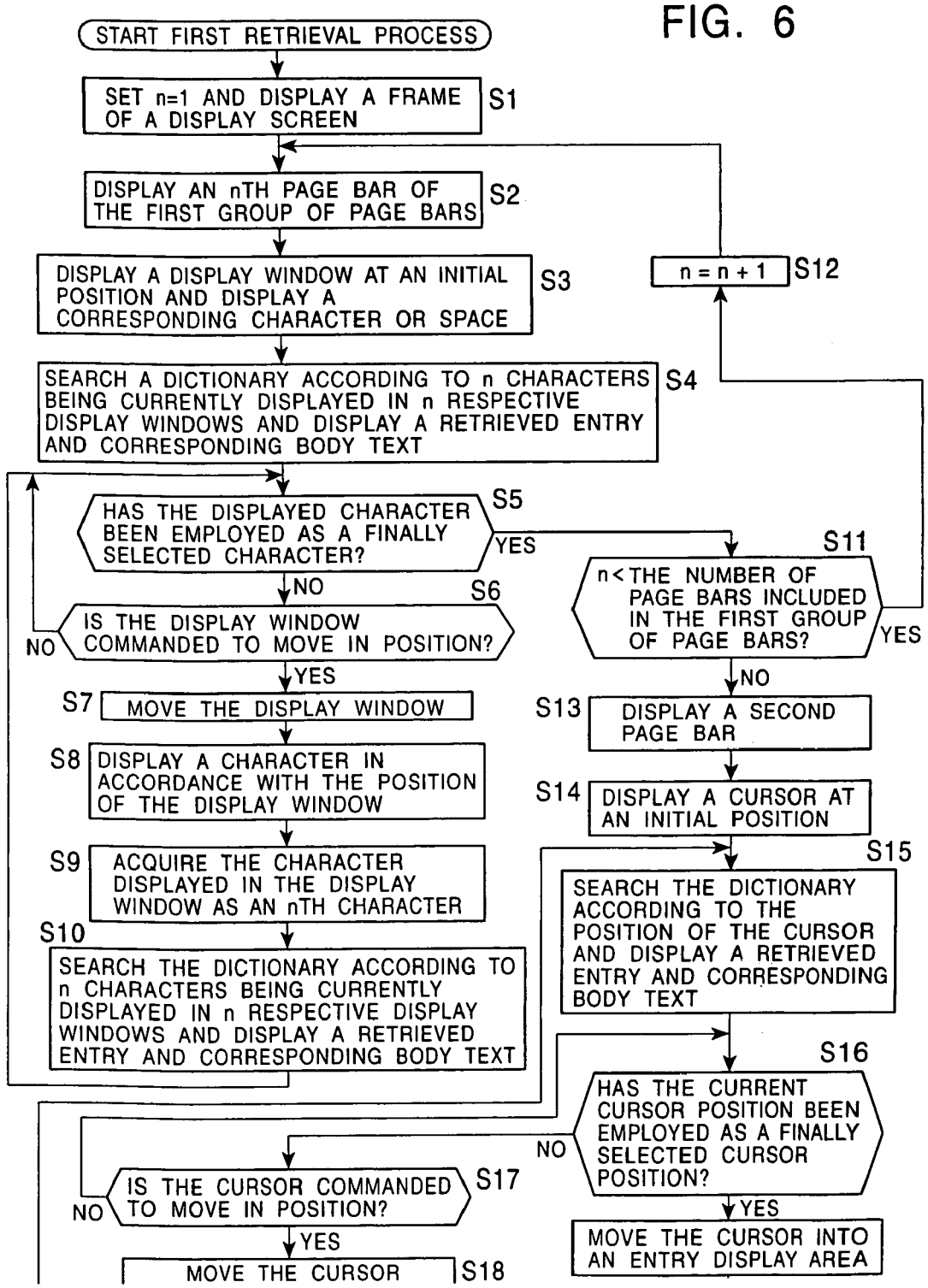
FIG. 6 is a flow chart showing a first retrieval process.

The next step S34 is performed in a similar manner to step S4 shown in FIG. 6.

Figure 15:
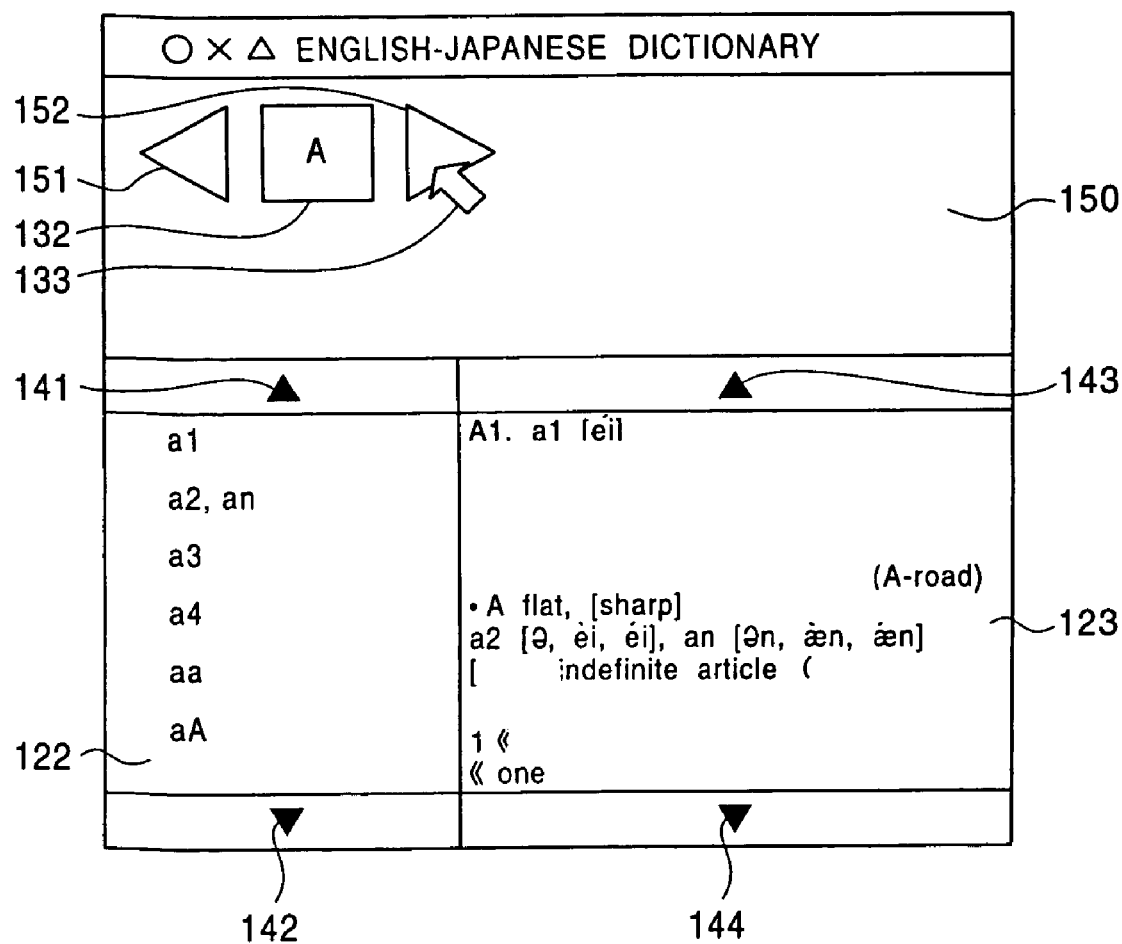
FIG. 15 is a diagram showing a GUI.

FIG. 15 shows an example of the display screen in the initial state in which n=1. In FIG. 15, similar parts to those in FIG. 7 are denoted by similar reference numerals and they are not described in further detail herein. The display screen shown in FIG. 15 is similar to that shown in FIG. 7, which is displayed when the first retrieval process 1 is performed, except that a display window display area 150 is displayed instead of the page bar display area 121.

A display window 132 similar to that described earlier with reference to FIG. 7 is displayed at a predetermined fixed position in the display window display area 150, and buttons 151 and 152 are also displayed in the display window display area 150 so that the button 151 or 152 can be used to change the character displayed in the display window 132. For example, the buttons 151 and 152 may be operated by selecting the button 151 or 152 with a cursor 133 after moving the cursor 133 to the position of the button 151 or 152 by operating the mouse or the touchpanel. Alternatively, the button 151 or 152 may be operated by pressing a corresponding arrow key, rotating a jog dial, or performing another operation properly defined in a specific apparatus.

The next step S35 is performed in a similar manner to step S5 shown in FIG. 6.

In a case in which it is determined in step S35 that a character has not been selected, the process proceeds to step S36. In step S36, the control unit 102 determines whether an inputting operation (selecting the button 151 or 152 by moving the cursor 133 to the corresponding position) requesting the character being displayed to be changed is performed. In a case in which it is determined in step S36 that the inputting operation is not performed to request the character to be changed, the process flow returns to step S35 to repeat the process described above.

If it is determined in step S36 that the inputting operation requesting the character to be changed is performed, the process proceeds to step S37. In step S37, in accordance with the inputting operation, the control unit 102 changes the character being displayed.

Steps S38 and S39 are performed in a similar manner to steps S9 and S10, respectively, shown in FIG. 6. After step S39, the flow returns to step S35 to repeat the process described above.

Figure 16:
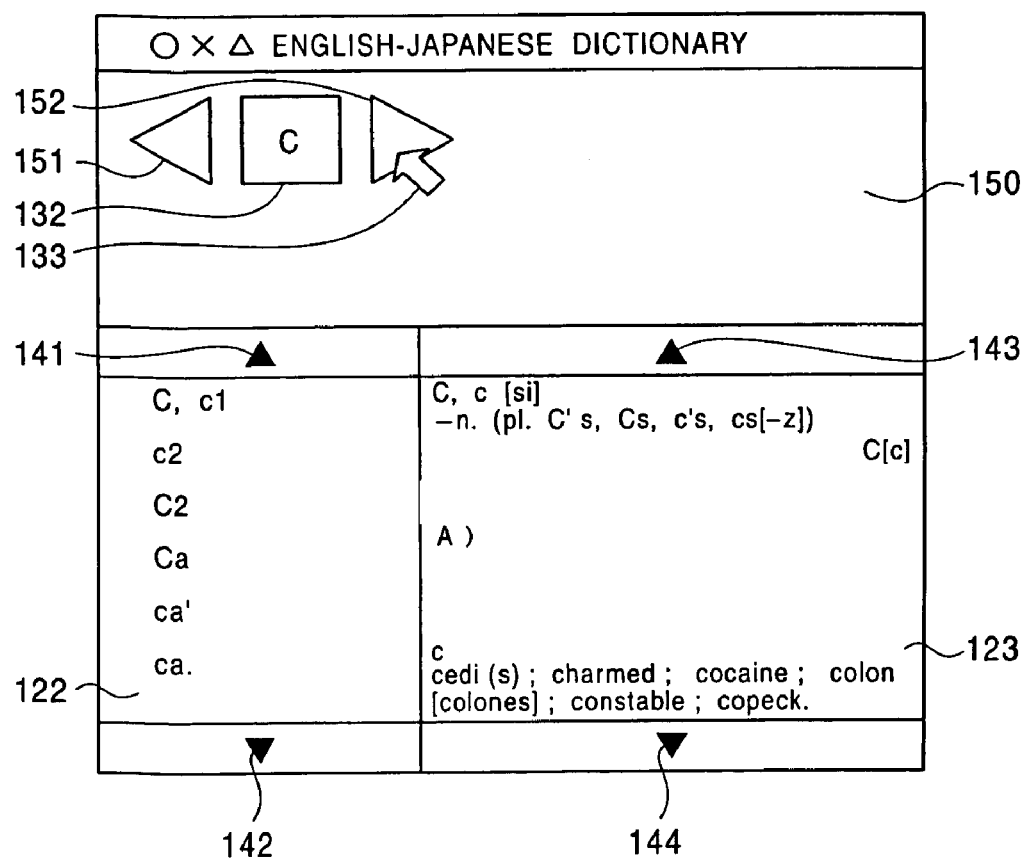
FIG. 16 is a diagram showing a GUI.

For example, if a character "C" is displayed in the display window 132 as shown in FIG. 16 in response to operating the button 152 described above with reference to FIG. 15, entries and a main body corresponding to the character "C" being displayed are displayed in the entry display area 122 and the main body display area 123, respectively.

In a case in which it is determined in step S35 that a character has been selected, the process proceeds to step S40. In step S40, the control unit 102 determines whether the number, n, of display windows being currently displayed is smaller than the maximum number of display windows.

In a case in which it is determined in step S40 that the number, n, of display windows being currently displayed is smaller than the maximum number of display windows, the process proceeds to step S41. In step S41, the control unit 102 increments the value of n indicating the number of display windows being currently displayed such that n=n+1. Then the process flow returns to step S32 to repeat the process described above.

Figure 17:
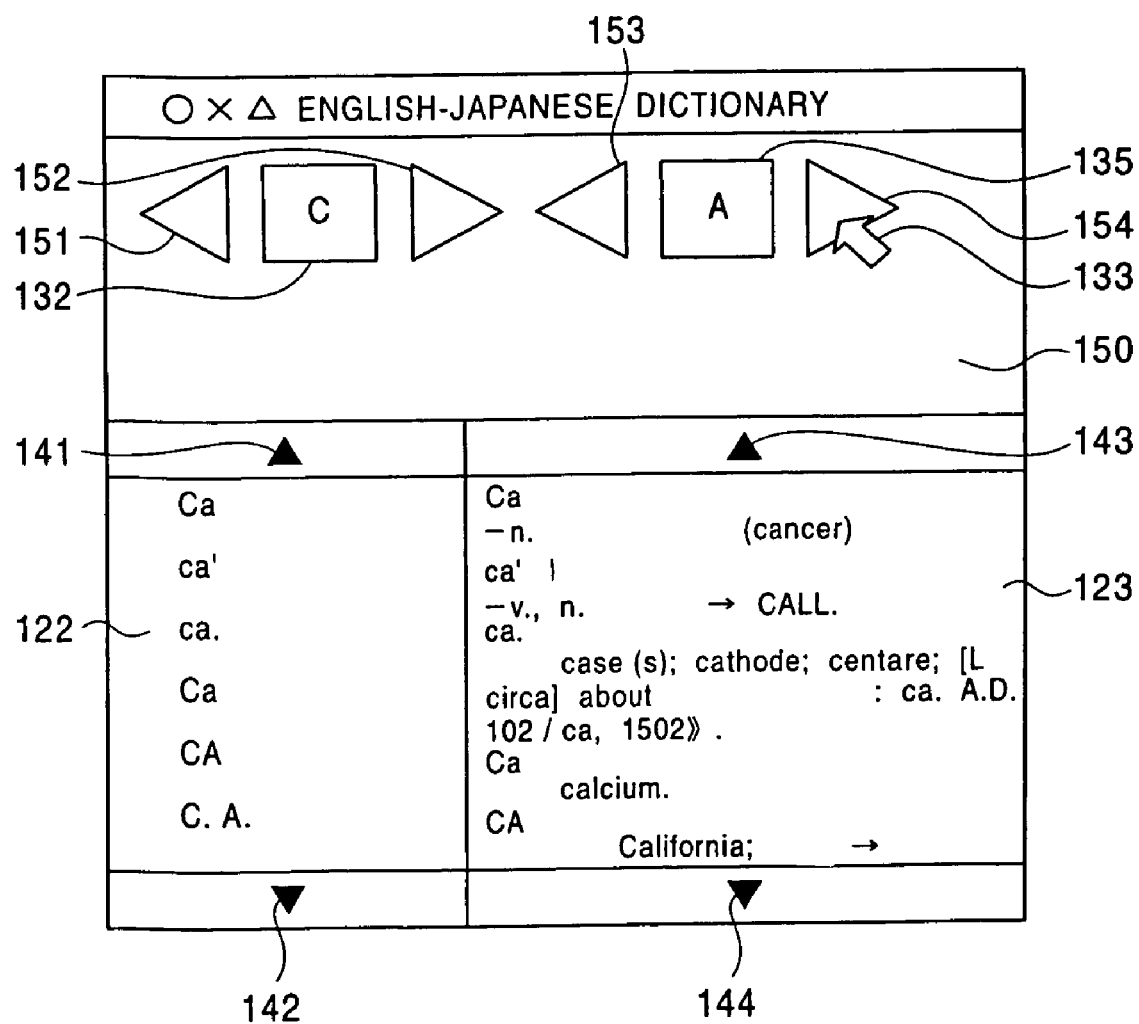
FIG. 17 is a diagram showing a GUI.
Figure 18:
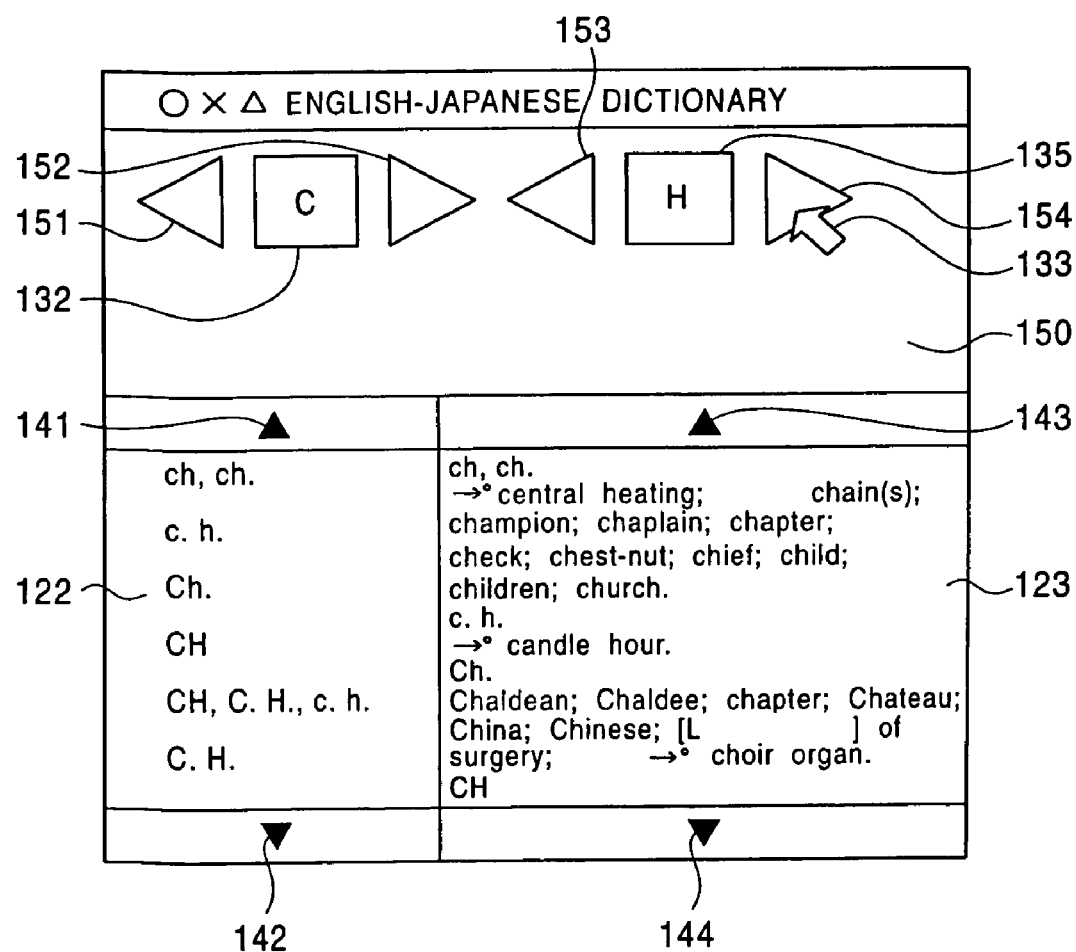
FIG. 18 is a diagram showing a GUI.

Thus, as shown in FIG. 17, a second display window 135 is displayed together with buttons 153 and 154, and forward retrieval is performed on the basis of the characters "C" and "A" displayed in the display windows 132 and 135, respectively. Retrieved entries and main body are displayed in the entry display area 122 and the main body display area 123. If the character displayed in the display window 135 is changed in response to an operation on the button 154 from "A" as shown in FIG. 17 to "H" as shown in FIG. 18, forward retrieval is performed on the basis of the characters "C" and "H" displayed in the respective display windows 132 and 135, and retrieved entries and main body are displayed in the entry display area 122 and the main body display area 123, respectively.

In a case in which it is determined in step S40 that the number, n, of display windows being currently displayed is not smaller than the maximum number of display windows, the process proceeds to step S42. In step S42, the control unit 102, generates a control signal for displaying a page bar 136 similar to the second-type page bar used in the first retrieval process, that is, similar to the page bar 136 described earlier with reference to FIG. 11. The generated control signal is output to the display controller 106. The display controller 106 controls the display unit 107 so as to display the page bar 136.

In step S43, the cursor 133 is displayed at an initial position on the page bar 136, in a similar manner as in step S14 described above with reference to FIG. 6.

Figure 19:
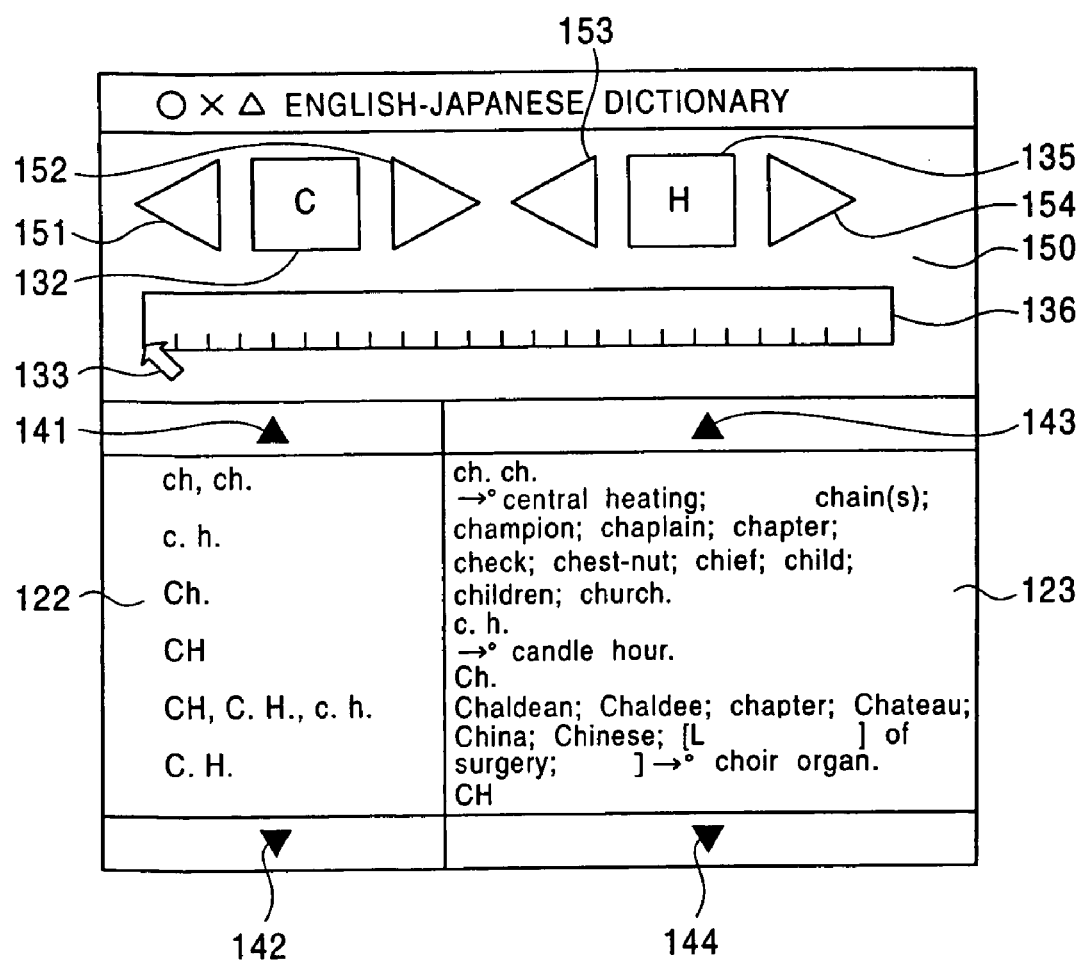
FIG. 19 is a diagram showing a GUI.

FIG. 19 shows an example of the display screen for the case in which the maximum number of display windows is two, wherein the page bar 136 is displayed and furthermore the cursor 133 is displayed at the initial position on the page bar 136. In the display screen displayed in the second retrieval process, as can be seen from FIG. 19, the removal of the page bars 131 and 134 from the page bar display area 121 in the first retrieval process allows large-size characters to be displayed in the display windows 132 and 135, even when the display window display area 150 is smaller in size than the page bar display area 121.

Thereafter, steps S44 to S48 are performed in a similar manner as in steps S15 to S19, and the entire process is completed.

Figure 20:
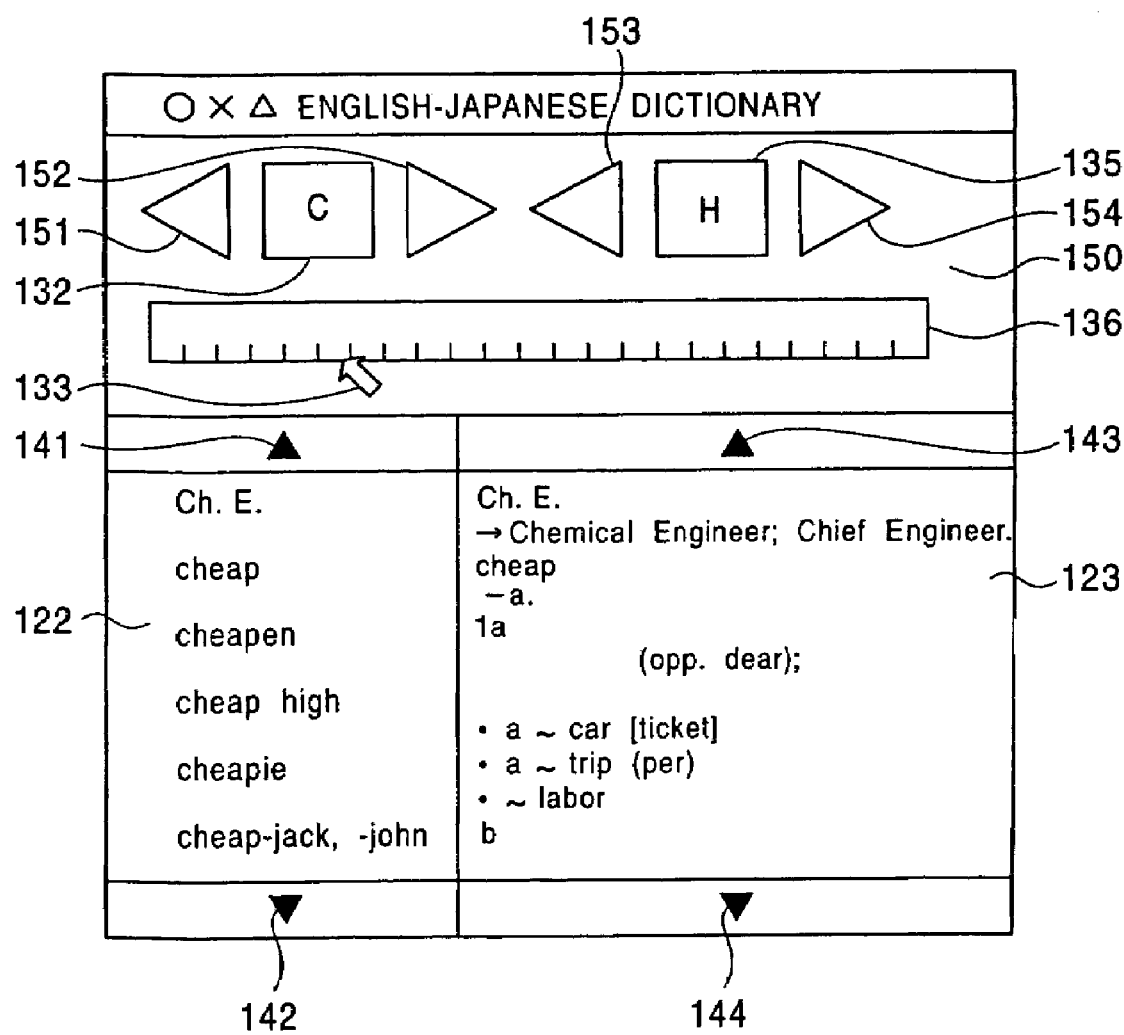
FIG. 20 is a diagram showing a GUI.
Figure 21:
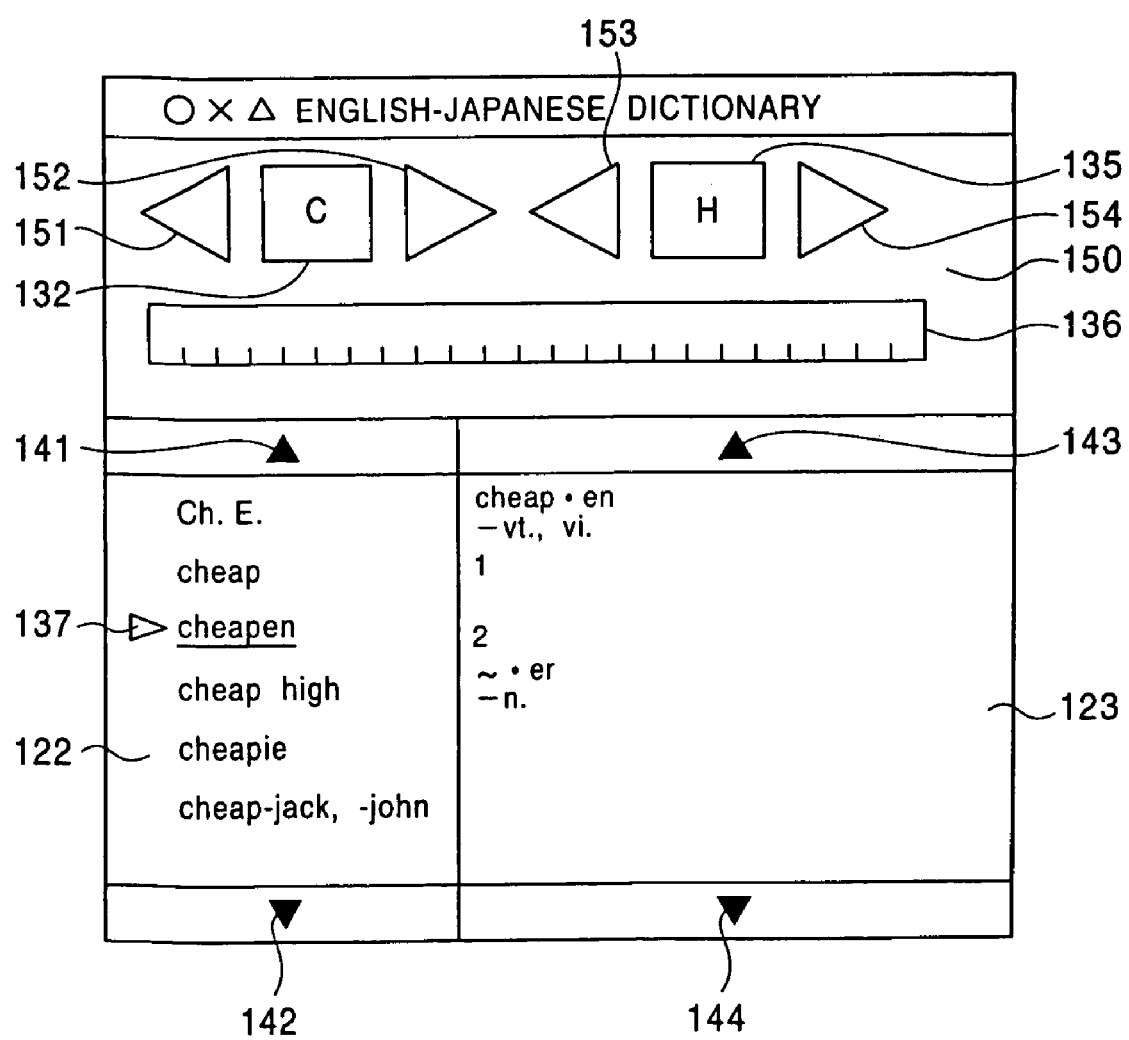
FIG. 21 is a diagram showing a GUI.

That is, if the position of the cursor 133 is changed as shown in FIG. 20, entries and a main body corresponding to the position of the cursor 133 are displayed in the entry display area 122 and the main body display area 123, respectively. Furthermore, if it is determined that the position of the cursor 133 has been fixed, then the cursor 137 is displayed as shown in FIG. 21 so that a user can select one of entries displayed in the entry display area 122. A selected entry may be underlined or reversed in intensity. The user can select a desired entry by moving the cursor 137 displayed in the entry display area 122 to a position corresponding to the desired entry. A main body corresponding to the entry pointed to by the cursor 137 is displayed in the main body display area 123.

By employing the process described above, it becomes possible to retrieve information from an electronic dictionary via a user-friendly GUI on an apparatus having a small-sized display screen (such as the PDA 21).

In the present embodiment, the maximum number of display windows is two, the maximum number may be one, or, conversely, three or more. The page bar 136 may not be used, and the retrieval process may be perform using only the display windows.

In the above examples, the electric dictionary is assumed to include only text data. However, also in a case in which the electric dictionary further includes still image data, audio data, or motion image data, the process can also be performed in a similar manner.

Note that the present invention can be applied not only to retrieval of information from a dictionary, but also to retrieval of information from general electronic books using an index as a retrieval key. A chapter number or a section number corresponding to a main body may be displayed in a display window, and the chapter number or the section number may be changed in response to an inputting operation performed by a user. In this case, in response to the chapter number of the section number being displayed, a subtitle of the corresponding chapter or section may be displayed in the entry display area 122, and a beginning portion of a main body corresponding to the subtitle may be displayed in the main body display area 123. This makes it possible for a user to quickly select a desired portion from an electronic book including an extremely large amount of information in a special field.

The process described above may be executed by software. When the process is executed by software, a program forming the software may be installed from a storage medium onto a computer which is provided as dedicated hardware or may be installed onto a general-purpose computer capable of performing various processes in accordance with various programs installed thereon.

Various types of storage media such as those shown in FIGS. 1 to 4 may be used for the above purpose. That is, specific examples of storage media for this purpose include a magnetic disk 14 (such as a floppy disk), an optical disk 15 (such as a CD-ROM (Compact Disk-Read Only Memory) and a DVD (Digital Versatile Disk)), a magnetooptical disk 16 (such as an MD (Mini-Disk) (trademark)), and a semiconductor memory 17, in the form of a package medium on which a program is stored and which is supplied to a user separately from a computer.

In the present description, the steps described in the program stored in the storage medium may be performed either time-sequentially in accordance with the order described in the program or in a parallel or separate fashion.

In the present description, the term "system" is used to represent an entire set of a plurality of apparatuses.

As can be understood from the above description, the present invention has great advantages. That is, in the first information processing apparatus, information processing method, and program, according to the present invention, displaying a display window for displaying one character therein is controlled in accordance with an inputting operation performed by a user, displaying the character in the display window is controlled in accordance with an inputting operation performed by the user, and the character being displayed is acquired, thereby allowing the user to easily input a character via a display screen without having to use a keyboard. Because the display screen used in the above process is very simple, the display screen needs a small size.

In the second information processing apparatus, information processing method, and program, according to the present invention, electronic book data is stored, displaying a display window for displaying one character therein is controlled so as to be displayed at a specific position in accordance with an inputting operation performed by a user, displaying the character in the display window is controlled in accordance with an inputting operation performed by the user, the character being displayed is acquired, displaying a graphics image indicating a specific area is controlled, information indicating a position selected by a user within the area indicated by the graphics image is acquired in accordance with an inputting operation performed by the user, specified data is retrieved from the electronic book data in accordance with the acquired character and the acquired information indicating the position, and the retrieved data is displayed, whereby the user can easily input a character without having to use a keyboard and easily specify a position in the graphics image to retrieve information from the electronic book data in accordance with the input character and the input position information. Because the display screen used in the above process is very simple, the display screen needs a small size.

What is claimed is:

1. An information processing apparatus comprising:
   input operation reception means for receiving user inputting operations;
   display control means for controlling displaying of only a first display window in which a single character is displayed and a second display window in which a single letter is displayed;
   said display control means controlling in accordance with the user inputting operations received by said input operation reception means the displaying of the single letter in said first display window and the single letter displayed in said second display window displayed under control of said display control means; and
   character acquisition means for acquiring the letters displayed under control of said display control means.

2. The information processing apparatus according to claim 1, wherein said display control means controls displaying of a graphics image indicating an area within which said first and second display windows are allowed to move,
   wherein said display control means controls displaying said first and second display windows so that respective positions of said first and second display windows are moved in accordance with the user inputting operations received by said input operation reception means within said graphics image displayed under control of said display control means, and
   said display control means determines in accordance with the positions of said first and second display windows which letter is to be respectively displayed in said first and second display windows.

3. The information processing apparatus according to claim 1, further comprising:
   storage means for storing electronic book data;
   retrieval means for retrieving data from the electronic book data stored in the storage means in accordance with said letters acquired by the character acquisition means; and
   said display control means controlling displaying said dataretrieved by said retrieval means.

4. An information processing method comprising:
   an input operation reception step of receiving user inputting operations;
   a display control step of controlling displaying of only a first display window in which a single letter is displayed and of a second display window in which a single letter is displayed;
   a step of controlling in accordance with the user inputting operations received in said input operation reception step the displaying of the single letter in said first display window and the single letter in said second display window; and
   a character acquisition step of acquiring the letters displayed in said first and second display windows.

5. A storage medium including a computer-readable program stored therein, said program comprising:
   an input operation reception step of receiving user inputting operations;
   a display control step of controlling displaying of only a first display window in which a single letter is displayed and a second display window in which a single letter is displayed;
   a step of controlling in accordance with the user inputting operations received in said input operation reception step the displaying of the single letter in said first display window and the single letter in said second display window displayed under control performed in said display control step; and
   a character acquisition step of acquiring the letters displayed in said first and second display windows.

6. A program for causing a computer to execute a process comprising:
   an input operation reception step of receiving user inputting operations;
   a display control step of controlling displaying of only a first display window in which a single letter is displayed and of a second display window in which a single letter is displayed;
   a step of controlling in accordance with the user inputting operations received in said input operation reception step the displaying of the single letter in said first display window and the single letter in said second display window displayed under control performed in said display control step; and
   a character acquisition step of acquiring the letters displayed in said first and second display windows.

7. An information processing apparatus comprising:
   storage means for storing electronic book data;
   input operation reception means for receiving user inputting operations;
   display control means for controlling displaying at specific a first display window in which a single letter is displayed and a second display window in which a single letter is displayed;
   said display control means controlling in accordance with the user inputting operations received by said input operation reception means the displaying of the single letter in said first display window and the single letter in said second display window displayed under control by said display control means;

character acquisition means for acquiring the letters displayed under control of said display control means;

said display control means controlling displaying of a graphics image indicating a particular area;

position information acquisition means for acquiring information indicating a position selected by the user within the particular area displayed under control of said display control means in accordance with the user inputting operations received by said input operation reception means;

retrieval means for retrieving data from the electronic book data stored in the storage means in accordance with said letters acquired by the character acquisition means and in accordance with said information indicating the position acquired by the position information acquisition means; and said display control means controls displaying of said data retrieved by said retrieval means.

8. An information processing method comprising:

a storage step of storing electronic book data;

an input operation reception step of receiving a user inputting operations;

a display control step of controlling displaying at a first specific position only a first display window in which a single letter is displayed and at a second specific position only a second display window in which a single letter is displayed;

a step of controlling in accordance with the user inputting operations received in said input operation reception step the displaying of the single letter in said first display window and the single letter displayed in said second display window displayed under control performed in said display control step;

a character acquisition step of acquiring the letters displayed in said first and second display windows;

a step for controlling displaying of a graphics image indicating a particular area;

a position information acquisition step of acquiring information indicating a position selected by a user within the area displayed under control performed in said step for controlling in accordance with the user inputting operation received in said input operation reception step;

a retrieval step for retrieving data from the electronic book data stored in the storage step in accordance with said character acquired in the character acquisition step and in accordance with said information indicating the position acquired in the position information acquisition step; and a step of displaying said data retrieved in the retrieval step.

9. A storage medium including a computerreadable program stored therein, said program comprising:

a storage step of storing electronic book data, an input operation reception step of receiving a user inputting operations;

a display control step of controlling displaying at a first specific position only a first display window in which a single letter is displayed and at a second specific position only a second display window in which a single letter is displayed;

a step of controlling in accordance with the user inputting operations received in said input operation reception step the displaying of the single letter in said first display window and the single letter displayed in said second display window displayed under control performed in first display control step;

a character acquisition step of acquiring the letters displayed in said first and second display windows;

a step of displaying a graphics image indicating a particular area;

a position information acquisition step of acquiring information indicating a position selected by the user within the particular area displayed in said step in accordance with the user inputting operations received in said input operation reception step;

a retrieval step for retrieving data from the electronic book data stored in the storage step in accordance with said letters acquired in the character acquisition step and in accordance with said information indicating the position acquired in the position information acquisition step; and a step of displaying said data retrieved in the retrieval step.

10. A program for causing a computer to execute a process comprising:

a storage step of storing electronic book data, an input operation reception step of receiving user inputting operations;

a display control step of controlling displaying at a first specific position only a first display window in which a single letter is displayed and at a second specific position only a second display window in which a single letter is displayed;

a step of controlling in accordance with the user inputting operations received in said input operation reception step the displaying of the single letter in said first display window and the single letter displayed in said second display window displayed under control performed in said display control step;

a character acquisition step of acquiring the letters displayed in said first and second display windows;

a step of displaying a graphics image indicating a particular area;

a position information acquisition step of acquiring information indicating a position selected by the user within the area displayed in said step of displaying in accordance with the user inputting operations received in said input operation reception step;

a retrieval step for retrieving data from the electronic book data stored in the storage step in accordance with said letters acquired in the character acquisition step and in accordance with said information indicating the position acquired in the position information acquisition step; and a step of displaying said data retrieved in the retrieval step.

* * * * *

UNITED STATES PATENT AND TRADEMARK OFFICE
CERTIFICATE OF CORRECTION

PATENT NO. : 7,039,868 B2 Page 1 of 1
APPLICATION NO. : 10/192374
DATED : May 2, 2006
INVENTOR(S) : Yoshie Yanatsubo It is certified that error appears in the above-identified patent and that said Letters Patent is hereby corrected as shown below:

On the title page item, (57) ABSTRACT, line 4, delete "a", second occurrence.
Column 3, line 19, "provide" should read --provides--.
Column 4, line 11, "forth" should read --fourth--.
Column 8, line 16, "A" should read -- An--.
Column 14, line 25, "is" should read --are--.
Column 16, line 12, "perform" should read --performed--.
Column 20, line 11, insert space after "data".
Column 20, lines 62-63, delete "specific".
Column 21, line 56, "computerreadable" should read --computer-readable--.
Column 21, line 59, delete "a".

Signed and Sealed this

Twenty-sixth Day of December, 2006

JON W. DUDAS
*Director of the United States Patent and Trademark Office*